US012789141B2

(12) United States Patent
Veal et al.

(10) Patent No.: US 12,789,141 B2
(45) Date of Patent: Nov. 10, 2026

(54) SYSTEMS AND METHODS FOR EXTRACTING AND REMOVING HYDROGEN SULFIDE AND THIOLS

(71) Applicant: SM Intellectual Technologies LLC, La Porte, TX (US)

(72) Inventors: Jack Veal, Morgan, TX (US); Jefferey St. Amant, Stonewall, LA (US)

(73) Assignee: SM Intellectual Technologies LLC., La Porte, TX (US)

( * ) Notice: Subject to any disclaimer, the term of this patent is extended or adjusted under 35 U.S.C. 154(b) by 584 days.

(21) Appl. No.: 18/339,747

(22) Filed: Jun. 22, 2023

(65) Prior Publication Data

US 2024/0424443 A1 Dec. 26, 2024

(51) Int. Cl.
*B01D 53/86* (2006.01)
*B01D 53/75* (2006.01)
(Continued)

(52) U.S. Cl.
CPC ......... *B01D 53/8615* (2013.01); *B01D 53/75* (2013.01); *B01J 21/18* (2013.01);
(Continued)

(58) Field of Classification Search
CPC ................ B01D 53/8615; B01D 53/75; B01D 2255/20723; B01D 2255/20738;
(Continued)

(56) References Cited

U.S. PATENT DOCUMENTS 4,547,619 A 10/1985 Diaz
5,344,626 A 9/1994 Abler
(Continued)

FOREIGN PATENT DOCUMENTS

WO 2024263192 A1 12/2024

OTHER PUBLICATIONS

PCT Application No. PCT/US2023/068904, International Search Report and Written Opinion dated Feb. 2, 2024.
(Continued)

*Primary Examiner* — Anthony J Zimmer
*Assistant Examiner* — Syed T Iqbal
(74) *Attorney, Agent, or Firm* — Polsinelli

(57) ABSTRACT

Compositions and methods for the removal of hydrogen sulfide, vapor phase thiols, carbonyl sulfide, and combinations thereof, from gas/vapor streams are provided through the utilization of a regenerable formulated media. The compositions may include a bound complex treated-activated carbon media (BCT-AC media). The compositions and methods provide advantages over current known technologies by reducing the number of required process steps and resulting reduction in capital and operating costs, as well as elimination of aqueous phase processes that are expensive to operate and generate unwanted waste by products. Additionally, the compositions and methods provided remove hydrogen sulfide as recoverable elemental sulfur and are ideally suited for gas/vapor phase applications where carbon dioxide may be present as it has no process or economic impact on the compositions or methods.

12 Claims, 17 Drawing Sheets

(51) Int. Cl.
*B01J 21/18* (2006.01)
*B01J 23/89* (2006.01)
*B01J 38/56* (2006.01)

(52) U.S. Cl.
CPC ............. *B01J 23/898* (2013.01); *B01J 38/56* (2013.01); *B01D 2255/20723* (2013.01); *B01D 2255/20738* (2013.01); *B01D 2255/20746* (2013.01); *B01D 2257/304* (2013.01); *B01D 2257/306* (2013.01); *B01D 2257/308* (2013.01)

(58) Field of Classification Search
CPC .... B01D 2255/20746; B01D 2257/304; B01D 2257/306; B01D 2257/308; B01D 53/8612; B01D 53/9495; B01D 2255/702; B01J 21/18; B01J 23/898; B01J 38/56
See application file for complete search history.

(56) References Cited

U.S. PATENT DOCUMENTS

| | | | | | |
|---|---|---|---|---|---|
| 5,454,933 | A | * | 10/1995 | Savage .................. | C10G 67/06 208/299 |
| 5,478,541 | A | | 12/1995 | Samuels et al. | |
| 11,000,825 | B1 | | 5/2021 | Veal et al. | |
| 11,779,902 | B1 | * | 10/2023 | Veal .................. | B01J 20/28061 252/190 |
| 2009/0220767 | A1 | | 9/2009 | Schlögl et al. | |
| 2018/0296969 | A1 | | 10/2018 | Awadh et al. | |

OTHER PUBLICATIONS

Wirling et al., "Safety aspects in use of carbonaceous sorbents during waste gas treatment," Reprint from 'Metallurgical Plant and Technology,' vol. 3, May 2007, pp. 144-152.

Tan et al., "Enhancing catalytic performance of activated carbon supported Rh catalyst on heterogeneous hydroformylation of 1-hexene via introducing surface oxygen-containing groups," Applied Catalysis A: General, vol. 527, Oct. 2016, pp. 53-59.

Li et al., "Synthesis of Co1Cu2(BHTC)2 and Its Application in Adsorption Desulfurization," Australian Journal of Chemistry, vol. 68, Issue 10, May 2015, pp. 1524-1528.

Khabazipour et al., "Removal of Hydrogen Sulfide from Gas Streams Using Porous Materials: A Review," Industrial & Engineering Chemistry Research, vol. 58, Issue 49, Dec. 2019, pg. A-Z and AA-AF.

* cited by examiner $[Fe_3^{+3}(\mu_3\text{-}O)(CH_3CO_2^-)_6(H_2O)_3]^{+1}$ [Anion (Not Shown)]$^{-1}$ $[Fe_3^{3+}(\mu_3\text{-}O)(CH_3CO_2^-)_6(DDLB)_2(H_2O)]$ $[Fe_3^{3+}(\mu_3\text{-}O)(CH_3CO_2^-)_6(DDLB)_2(H_2S)]$ $[Fe_3^{3+}(\mu_3\text{-}O)(CH_3CO_2^-)_6(DDLB)_2(H_2S)]$

SYSTEMS AND METHODS FOR EXTRACTING AND REMOVING HYDROGEN SULFIDE AND THIOLS

FIELD

The present disclosure is broadly concerned with compositions, systems and methods for the removal of hydrogen sulfide and light thiols from gas streams. In particular, the present disclosure is related to a composition where Tri-transition metal-oxo complexes with [$Fe_2M(\mu_3$-O)] as the core structure in the class of Inverse Coordination complexes is bound to activated carbon particle surface sites such that two binding sites function as ligands in the bound oxo complex.

BACKGROUND

Sulfur containing compounds, such as hydrogen sulfide and mercaptans/thiols, are common components of hydrocarbon oil field and refinery process streams. Of these compounds, hydrogen sulfide is the most problematic, and undesirable due to its intrinsic toxicity and corrosivity. Therefore, it is desirable, and most times a requirement, to reduce the concentration of hydrogen sulfide and/or mercaptans from hydrocarbon gas/vapor streams, hydrocarbon liquid headspaces and various vapor streams being discharged to the environment. These sulfur contaminants, when present in gas phase systems yield under desirable conditions ranging from creating corrosive environments to plant infrastructures, create a significant health concern for workers and the general public, can pose combustion/explosive risks, are harmful to the environment and ecosystem, and are a nuisance caused by the foul odors associated with these products.

The US EPA along with other federal, state, and local agencies have historically developed policy and enforcement standards for the reduction of pollutants from air and water resulting from various processes. The authority of such derives from the Clean Air Act, Clean Water Act, and subsequent legislative actions. Examples of such policy developments include the National Ambient Air Quality Standards (NAAQS), which defines the allowable air quality limits for compounds such as Volatile Organic Compounds, Oxides of Nitrogen, Oxides of Sulfur, etc.

Another such example is the EPA's Motor Vehicle Emission and Fuel Standards otherwise referred to simply as Tier II and Tier III which reduces the allowable content of sulfur in fuels such as diesel and gasoline. As a result of these regulatory directives, the removal/limiting of sulfur compounds from fuels which results in sulfur dioxide as well as the removal/limiting of sulfur compounds from water sources is a growing issue in the US and within other developed and developing nations.

Several conventional systems and processes can manage the concentrations of hydrogen sulfide and other sulfur compounds in various matrixes. For instance, one conventional method for removal of hydrogen sulfide utilizes chemical amines to react hydrogen sulfide forming an aqueous soluble salt that is removed by phase separation from the hydrocarbon stream and then stripped as a vapor and routed to CLAUS units for conversion to and recovered as elemental sulfur. Additional processes, SULFEROX and STRETFORD utilize aqueous caustic soluble metal salts to convert aqueous soluble hydrosulfide anion to elemental sulfur (which is removed by complex floatation systems and the metal cation complex is oxidized by air flow (classical multistep redox chemistry). Such conventional systems require multiple treatment process steps, are capital intensive, are more costly to operate, are more energy intensive, have the potential to over oxidize sulfur to acidic oxides and are not suited for short term or mobile applications. Other conventional methods utilize chemical scavenger additives, such as the use of triazene based chemicals or iron sponges that chemically react with the hydrogen sulfide, but are less efficient, more costly, in most cases are non-regenerable and produce waste byproducts. These forementioned technologies were all designed and developed to minimize the impact of $CO_2$ from reaction chemistries used for $H_2S$ management. One of the primary advantages of the covered invention is the demonstrated ability to reduce $H_2S$ while having no impact resulting from the presence of $CO_2$ in the vapor stream.

Accordingly, there is a need for a system and application method to control $H_2S$ that remedies the deficiencies of current conventional systems and processes. The improved process of the covered invention, has more flexible operation requirements, is consistently economical to operate, and operable to meet product quality standards for natural gas, propane, butane, mixtures of propane and butane, light naphtha, and mixed vapor streams containing $H_2S$. The improved process would, thereby reduce toxicity and corrosivity concerns, address product quality issues and improve mitigation of infrastructural concerns as well as salability or usability of the product, while also improving Health, Safety and Environmental risks that are associated with working around $H_2S$ environments including toxic chemistries associated with other conventional processes.

SUMMARY OF THE DISCLOSURE

Provided herein are methods for removal of hydrogen sulfide [$H_2S$], vapor phase Thiols [RSH], carbonyl sulfide [COS] or any combination thereof from a gas/vapor stream. The methods include contacting the gas/vapor stream with a bound complex treated-activated carbon media (BCT-AC media), the BCT-AC media comprising an activated carbon surface with a molecular orbital surface-bound complex containing a tri-nuclear metal oxo core [$Fe_2M(\mu_3$-O)] molecular orbital structure. In some embodiments, the method further includes pre-treating the gas/vapor stream prior to contacting the BCT-AC media. In some additional embodiments, the method further includes regenerating the BCT-AC media through a hydrocarbon solvent wash. In some aspects, the hydrocarbon solvent comprises xylenes, toluene, or a combination thereof.

In some preferred embodiments, the method does not result in the formation of sulfur oxides. In additional embodiments, no aqueous caustic is added to the gas/vapor stream. In still further embodiments, no oxygen or oxidant is added to the gas/vapor stream.

In some embodiments, M in [$Fe_2M(\mu_3$-O)] is selected from the group consisting of Iron (Fe), Vanadium (V), and Cobalt (Co). In some aspects, the molecular orbital surface-bound complex containing a tri-nuclear metal oxo core [$Fe_2M(\mu_3$-O)] molecular orbital structure is [$Fe_3(\mu_3$-O)$(CH_3CO_2^-)_6$(ACS-DDLB)$_2$($H_2O$)], wherein ACS-DDLB refers to activated carbon surface bound dative donor ligand bonds bound to the trinuclear-oxo basic iron (III) acetate-stabilized complex.

In some embodiments, the activated carbon surface comprises unsaturated olefinic areas capable of forming dative donor ligand bonds. In some embodiments, the activated carbon is acid washed lignite activated carbon.

Further provided herein are systems for treating a gas/vapor stream comprising hydrogen sulfide [$H_2S$], vapor phase Thiols [RSH], carbonyl sulfide [COS], or any combination thereof. The systems include a first bound complex treated-activated carbon media (BCT-AC media) treatment vessel and a second BCT-AC treatment vessel, the BCT-AC treatment vessels including a BCT-AC media comprising an activated carbon surface with a molecular orbital surface-bound complex containing a tri-nuclear metal oxo core [$Fe_2M(\mu_3\text{-}O)$] molecular orbital structure, wherein the gas/vapor stream flows through the first BCT-AC treatment vessel, the second BCT-AC treatment vessel, or both BCT-AC treatment vessels. In some embodiments, the system further includes a pre-treatment system, wherein the pre-treatment system comprises a surge/knockout vessel, a particulate filtration system, a coalescing filter system, an activated carbon media guard bed, a bulk separation system, or any combination thereof.

In some embodiments, the system further includes a hydrocarbon solvent regeneration system in fluid communication with the treatment vessel, such that a hydrocarbon solvent is operable to remove elemental sulfur and disulfide compounds from the surface of the BCT-AC media. In some aspects, the hydrocarbon solvent regeneration system includes a recycle loop for reuse of the hydrocarbon solvent. In some additional aspects, the hydrocarbon solvent does not alter the structure, chemical stability, or electron density transfer of the BCT-AC media. In preferred embodiments, the hydrocarbon solvent comprises xylenes, toluene, or a combination thereof.

In some embodiments, M in [$Fe_2M(\mu_3\text{-}O)$] is selected from the group consisting of Iron (Fe), Vanadium (V), and Cobalt (Co). In some aspects, the molecular orbital surface-bound complex containing a tri-nuclear metal oxo core [$Fe_2M(\mu_3\text{-}O)$] molecular orbital structure is [$Fe_3(\mu_3\text{-}O)(CH_3CO_2^-)_6(\text{ACS-DDLB})_2(H_2O)$], wherein ACS-DDLB refers to the activated carbon surface dative donor ligand bonds with orbitals on the $Fe_3(\mu_3\text{-}O)$ core structure chemically binding the complex to the surface.

In some embodiments, the activated carbon surface comprises unsaturated olefinic defects. In some embodiments, the activated carbon is acid washed lignite activated carbon.

Further provided herein are methods of making a bound complex treated-activated carbon media (BCT-AC media). The methods include mixing or blending an alcohol and a Reagent Liquor with activated carbon, the Reagent Liquor comprising a metal complex having the structure [$Fe_2M(\mu_3\text{-}O)(CH_3CO_2^-)_6(H_2O)_3]^{+1}[\text{Anion}]^{-1}$, thereby forming a wetted activated carbon; evaporating excess liquid from the wetted activated carbon; and heating the wetted activated carbon to no more than 250° F.

In some embodiments, the alcohol comprises ethanol, such as denatured ethanol.

In some embodiments, the alcohol is pre-mixed with the Reagent Liquor and sprayed onto the activated carbon until the mixture is capillary absorbed by the activated carbon. In some embodiments, the evaporating step is conducted at a temperature of no more than 250° F. In other embodiments the evaporating step is conducted at temperatures from 200° F. to 220° F.

In some embodiments, M in [$Fe_2MFe_2M(\mu_3\text{-}O)$], is selected from the group consisting of Iron (Fe), Vanadium (V), and Cobalt (Co). In some embodiments, Anion is a chloride anion or a nitrate anion.

In some embodiments, the activated carbon surface comprises unsaturated olefinic defects. In some embodiments, the activated carbon is acid washed lignite activated carbon. In a preferred embodiment, the acid washed lignite activated carbon originates from Cologne, Germany.

In some embodiments, the alcohol is added to the activated carbon during the mixing or blending before the Reagent Liquor is added to the activated carbon. In further embodiments, the Reagent Liquor is added to the activated carbon immediately after the alcohol is added to the activated carbon. In still further embodiments, the activated carbon is mixed/blended until all of the liquids are absorbed by the activated carbon.

In some embodiments, an amount of Reagent Liquor and alcohol is added such that a sieve drain test does not result in any observed liquid drainage. In some embodiments, the r Reagent Liquor and alcohol is added by spraying. In some embodiments, the method further includes spraying the alcohol onto the activated carbon during the mixing. In some embodiments, the amount of Reagent Liquor and alcohol added is less than the media retention capacity of the activated carbon. In some embodiments, the method further comprises pre-mixing the alcohol and the Reagent Liquor prior to the mixing or blending.

In some embodiments, the evaporation is accomplished via a hot air dryer. In some embodiments, the solvent evaporation is accomplished at a temperature of no more than 250° F. In some embodiments the evaporating step is conducted at temperatures from 200° F. to 220° F. In some embodiments, the heating is accomplished via a hot air dryer. In some embodiments, the mixing is accomplished with a rotary mixer.

In some embodiments, the method further comprises spraying a reagent liquor onto the activated carbon, that the total liquids do not exceed the holding capacity of the media used, the method further includes heating the wetted media with hot air drying.

In some embodiments, the method further includes curing the activated carbon at a temperature of no more than 255° F.

In some embodiments, the evaporating and heating steps are accomplished in a single hot air dryer having a variable flow with a constant air temperature. In some aspects, the constant air temperature is from about 200° F. to about 220° F. In some aspects, the constant air temperature is no more than 250° F.

Further provided herein are compositions for removal of hydrogen sulfide [$H_2S$], vapor phase Thiols [RSH], carbonyl sulfide [COS] or any combination thereof from a gas/vapor stream. The compositions generally include a porous solid media comprising a bound basic iron (III) acetate-stabilized complex bonded to a surface of a porous solid media, wherein the bound basic iron (III) acetate-stabilized complex comprises a [$Fe_3(\mu_3\text{-}O)$] core structure and the porous solid media comprises acid washed lignite activated carbon that originates from Cologne, Germany. In some embodiments, the porous solid media comprises particles having a particle size of from about 0.50 millimeters to about 2.50 millimeters. In some embodiments, the porous solid media comprises particles having a surface area of from about 250 $m^2/g$ to about 1000 $m^2/g$. In still further embodiments, the porous solid media comprises particles having a total pore volume from about 0.25 to about 1.15 ml/g.

BRIEF DESCRIPTION OF THE FIGURES

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
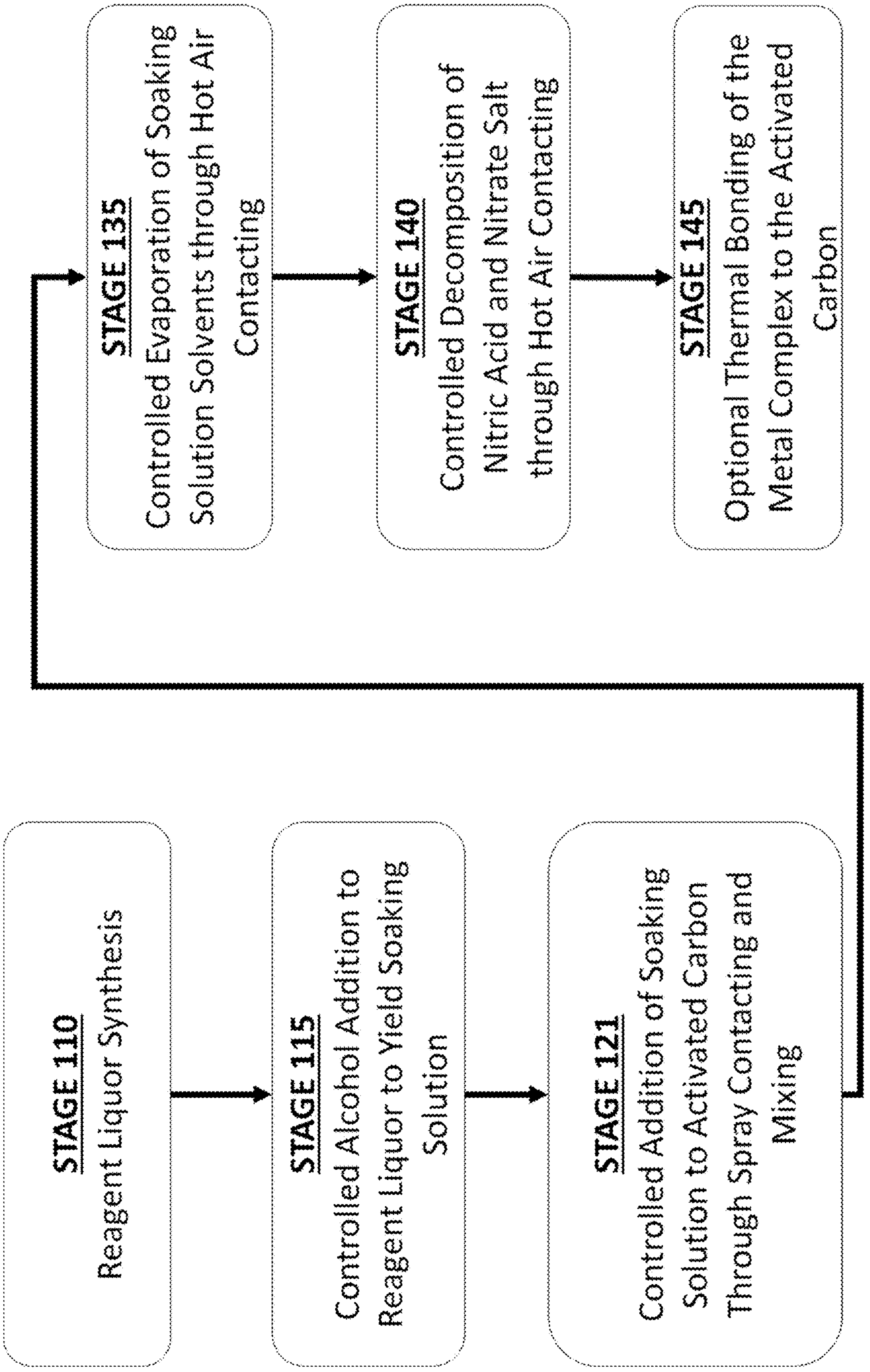
FIGS. 1*a*-1*b* show flow diagrams depicting the process stages for the formulation of the bound complex treated-activated carbon (BCT-AC) product formed through chemical bonding of an Trinuclear-oxo "Inverse coordination" transition metal complex cation to activated carbon surface sites capable of ligand formation when the surface sites are bonded through molecular orbitals to the complex cation.

It is to be understood that the present inventive concept is not limited in its application to the details of construction and to the embodiments of the components set forth in the following description or illustrated in the drawings. The figures and written description are provided to teach any person skilled in the art to make and use the inventions for which patent protection is sought. The present inventive concept is capable of other embodiments and of being practiced and carried out in various ways. Persons of skill in the art will appreciate that the development of an actual commercial embodiment incorporating aspects of the present inventive concept will require numerous implementations and specific decisions to achieve the developer's ultimate goal for the commercial embodiment. While these efforts may be complex and time consuming, these efforts, nevertheless, would be a routine undertaking for those of skill in the art of having the benefit of this disclosure.

It will be appreciated that numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

The present disclosure pertains to formulation methods and applications of an acidic aqueous trinuclear-oxo basic iron (III) acetate-stabilized cation $[Fe_3(\mu_3\text{-}O)(CH_3CO_2^-)_6(H_2O)_3]^{+1}$. When the above complex cation is chemically bound through molecular orbitals to the surfaces of an activated carbon media, it may be utilized to remove vapor phase hydrogen sulfide ($H_2S$) from hydrocarbon gases or vapors and mixed vapor streams through conversion to solid oxidized elemental sulfur(S) chains and rings. When trinuclear-oxo basic iron (III) acetate-stabilized complex ligands are bound to conjugated unsaturated areas on an activated carbon surface through dative donor ligand bond-forming molecular orbitals, it has been discovered that complex molecular orbitals are formed that can transfer electron density from the complex's non-surface bound ligand to the ligands formed with the activated carbon surface. It has also been discovered that, once formed, this surface-bound molecular structure is chemically stable and provides a pathway for electron density transfer without its chemical or molecular orbital structure being altered or degraded by the electron density transfer. It has also been discovered that vapor phase hydrogen sulfide will readily occupy the non-surface bound trans-out-of-plane complex ligand and when thus coordinated to the complex as a classical ligand it is instantaneously and quantitatively oxidized at ambient conditions to elemental sulfur. This is accomplished without chemical deactivation of the bound complex, or use of an alkaline aqueous phase, or the addition of an oxygen containing gas stream, or structural decomposition of the activated carbon media surface structure. Thus, when the reduced sulfur ($S^{-2}$) in $H_2S$ is present as a ligand on the surface bound complex, it interacts with the activated carbon surface through dative donor ligand bonding molecular orbitals without any additional chemical reactions or intermediate structural changes or rearrangements of complex or surface atomic or molecular structure. This electron transfer from the reduced sulfur through the molecular orbitals of the surface bound complex to the activated carbon surface electron sink is accomplished through the complex molecular orbital structure between the bound complex's orbitals and the dative donor ligand sites on the activated carbon surface at conjugated olefinic surface structures. The electron density transfer is facilitated through a special property of molecular orbitals formed between the non-surface bonded dative donor ligand on the complexed iron atoms through the trinuclear-oxo basic metal core, $[Fe_3(\mu_3\text{-}O)]$ in this case, to the activated carbon surface dative donor ligand bonding areas that provide an effective electron sink. The electron density flow is the result of the electron potential differential between the $S^{-2}$-$S^0$ oxidation potential and that of the conjugated olefinic surface of the activated carbon.

As an example, if the trinuclear-oxo basic iron (III) acetate-stabilized cation was not surface-bound and still soluble in solution, it could oxidize an "in-solution" reduced sulfur hydrogen sulfide ($HS^-$) species, but only through a multi-step classical REDOX process chemistry where the complex cation would accept one unit of electron density yielding a $Fe_3^{n}(\mu_3\text{-}O)$ species (wherein n=2⅓+) that would require oxidation back to $Fe_3^{+3}(\mu_3\text{-}O)$ by additional reagents and a second Sn2 cycle required to form elemental sulfur. But as this complex is only stable in acidic solutions, it cannot kinetically function as a solution-based treating system because $H_2S$ is not soluble in aqueous acidic solutions.

A core and critical property of this invention is that that a class of first transition series metals can be synthesized to form what is referred to as "Inverse Coordination chemistry" complexes where an electronegative atom such as oxygen is the central structural building block of the complex and defines its molecular orbital structure. A specific sub-group of this chemistry are the acetate-stabilized trinuclear-oxo basic metal $Fe_2M(\mu_3\text{-}O)$ aqueous cation complexes wherein M is selected from the group consisting of iron, vanadium, and cobalt, which are known to be able to REDOX with reduced sulfur species. What the inventors have surprisingly found is that trinuclear-oxo basic metal $Fe_2M(\mu_3\text{-}O)$ acetate-stabilized complexes comprising iron, vanadium, cobalt, and combinations thereof, when the metal complex is bound to the activated carbon surface through molecular orbitals to an activated carbon surface electron sink, the integrated orbital structure can function as an electron density transfer pathway between reduced sulfur ligands on the complex through the molecular orbital structures formed through the $Fe_2M(\mu_3\text{-}O)$ oxo hybridized molecular orbitals to unsaturated conjugated olefinic structures on an activated carbon surface. What the inventors have also surprisingly found is that the trinuclear-oxo $Fe_2M(\mu_3\text{-}O)$ core structure, when chemically bound through molecular orbitals to activated carbon surface conjugated olefinic sites, have the potential to transfer electrons directly from reduced sulfur to the activated carbon surface and stay intact. A specific example of this chemistry is the binding of trinuclear-oxo basic iron (III) acetate-stabilized trans out-of-plane orbitals to dative donor ligand forming areas on activated carbon surfaces formed by conjugated olefins structures with some similarities to the bonding found in the classical iron/carbon Ferrocene complexes. This results in the formation of a stable molecular orbital system connecting the $[Fe_3(\mu_3\text{-}O)]$ core's hybridized orbitals and unsaturated conjugated olefinic areas of the activated carbon surface that can function as electron sinks driving the electron density transfer.

The compositions of the present disclosure thus comprise trinuclear-oxo basic metal $Fe_2M(\mu_3\text{-}O)$ acetate-stabilized transition metal inverse coordination complexes composed of Fe, Co, or V or mixtures thereof. When the above complexes are bound in a specific manner to a specific activated carbon surface through molecular orbitals they can catalytically transfer electron density from reduced sulfur ligands on the bound complexes to the activated carbon surface electron sink. With this electron density transfer, the reduced sulfur in a hydrogen sulfide ligand on the complex will be oxidized to an elemental sulfur ligand and after sequent $H_2S$ reactions accumulate as chains and rings, thereby disengaging from the ligand binding site, and deposited as solid elemental sulfur on the activated carbon media surface retaining an elemental sulfur ligand. The retained elemental sulfur ligand frees the complex's non-surface bound ligand site to have the potential to immediately react with a different hydrogen sulfide molecule acting as a classical catalyst, but without the need for supporting reagents. The oxidized elemental sulfur will form short chains and dissociate from the activated carbon surface bound complex's ligand site and is deposited and accumulated on adjacent activated carbon surfaces. The deposition and accumulation of elemental sulfur will slowly physically foul the activated carbon surfaces and associated bound complex reaction sites. The produced elemental sulfur is not chemically bound to the activated carbon surfaces and can be quantitatively removed and recovered by an appropriate simple hydrocarbon solvent wash/extraction. The removal of elemental sulfur through the solvent washing does not deactivate the activated carbon surface-bound trinuclear-oxo basic metal acetate-stabilized complex. This allows the "working" bound chemically treated-activated carbon (BCT-AC) media treatment bed, to be regenerated in-situ and reused in place during field applications. The methods of removing the sulfur foulant and recovery of the BCT-AC media through a hydrocarbon solvent BCT-AC media bed wash is described further herein.

The use of electron density transfer between the reduced sulfur in the $H_2S$ ligand allows oxidation to elemental sulfur without the addition of a secondary chemical stream or the two-step Sn2 process chemistry inherent in classical REDOX cycle. And more specifically, that no aqueous phase or other reagent streams are required to facilitate the electron charge transfer as with current commercial processes that typically are based on a classical REDOX cycle.

The present disclosure further provides methods for formulating the BCT-AC media product through the utilization of specifically selected materials and their specific related formulations that are critically linked to BCT-AC media operational methods and procedures.

The present disclosure provides methods for the treatment of vapor phase streams including, but not limited to hydrocarbons that contain oxidizable vapor phase sulfur contaminants such as, but not limited to, hydrogen sulfide and vapor phase thiols. This is accomplished by utilizing the BCT-AC media compositions of the present disclosure. As described herein, it was surprisingly discovered that when the inverse coordination oxo class complexes are bound to dative donor ligand bonding areas on activated carbon particle surfaces, the bound complex's ligands and the activated carbon surface become connected through molecular orbitals that facilitate electron density flow from complex ligand sites to the activated carbon surface electron density sink. It was further surprisingly discovered that when a vapor phase hydrogen sulfide molecule occupies one of the complex's non-surface-bound ligand sites, electron density is directly transferred to the activated carbon surface through the bound system's molecular orbital structure, thereby oxidizing the reduced sulfur ($S^{-2}$) in hydrogen sulfide to oxidized elemental sulfur ($S^0$). In addition, the electron potential between the activated carbon surface dative donor ligand bonding site and the complex ligand site is not sufficient to oxidize sulfur past the elemental state preventing the potential for sulfur oxide formation.

The group of inverse coordination oxo class complexes that may be utilized to formulate the BCT-AC media are derived from the first transition metals, especially those of the octahedral d group, which readily form metal-oxo complexes. These metals include, but are not limited to, iron, vanadium, and cobalt. In particular, iron, cobalt, and vanadium were determined to have chemical properties consistent with the targeted BCT-AC media product. An exemplary complex that may be used to formulate BCT-AC media is acidic aqueous soluble trinuclear-oxo basic iron (III) acetate-stabilized complex cation with a molecular formula $[Fe_3(\mu_3\text{-}O)(CH_3CO_2^-)_6(H_2O)_3]^{+1}$ with its 3-D structure shown in FIG. 2*a*.

The critical property and the central element of this disclosure is the ability of the BCT-AC media to quantitively oxidize vapor phase hydrogen sulfide to elemental sulfur through direct vapor phase contact with the bound complex's non-surface bound ligand site at or near ambient conditions. Additionally, this reaction may be accomplished without the use of additional reagent streams such as caustic or oxygen/air required in most current processes. Also, this process is not a chemical reagent-based scavenger with recoverable elemental sulfur as the only waste/product stream. While a ligand site on the trinuclear-oxo basic iron (III) acetate-stabilized complex is the direct binding site for the hydrogen sulfide being treated, the overall reaction that creates elemental sulfur would not be possible if the complex were not chemically bound through a molecular orbital system to specialized dative donor ligand forming bonding sites on the activated carbon surface. Thus the chemical reaction process in the BCT-AC media product requires the selection of a specialized activated carbon material with surfaces that contain conjugated olefinic areas/zones that are capable of forming stable dative donor ligand bonding molecular orbitals with trans-out-of-plane orbitals on the BCT-AC complex. Such activated carbon materials include activated lignite carbon, as discussed further herein. When the aqueous acidic and alcohol soluble complex cation becomes bound to the activated carbon surface through molecular orbitals between the activated surface binding sites and Fe trans-out-of-plane orbitals, the complex becomes an insoluble carbon surface neutral functional group $[Fe_3(\mu_3\text{-}O)(CH_3CO_2^-)_6(\text{ACS-DDLB})_2(H_2O)]$ (refers to activated carbon surface bound dative donor ligand bonds bound to the trinuclear-oxo basic iron (III) acetate-stabilized complex). Once the surface binding molecular orbitals are formed the complex electron density can flow through the overall molecular orbital from complex ligand sites to conjugated olefinic areas/zones dissipating it over the bulk of the activated carbon mass that is an extensive electron density sink.

The BCT-AC media product is formulated utilizing the selected materials with the above-described properties and procedural steps described herein, which allow for the treatment of vapor-phase hydrogen sulfide ($H_2S$), volatile mercaptan sulfur compounds (also known as thiols), and carbonyl sulfide (COS) when present in gas/vapor streams. In particular, the presently disclosed compositions and methods may be especially useful in the field of removing hydrogen sulfide and thiols from gas phase hydrocarbons to meet transmission and end use requirements of said hydrocarbon vapor streams. The presently disclosed compositions and methods are also of particular use in the field of hydrogen sulfide ($H_2S$), volatile thiols/mercaptans, and carbonyl sulfide from vapor phase sources contributing to vapor phase atmospheric air emissions. Commonly known applications where the presently disclosed composition and methods may be usable include: vapor phase treatment of natural gas, vapor phase treatment of fuel gas systems, vapor phase treatment of natural gas prior to compression or liquification of natural gas, vapor phase air emissions from tank vents, sewer and wastewater systems are all some broad examples of the uses in vapor phase for the disclosed compositions and methods. The compositions may include high surface area porous solid substrates or solid absorbents capable of functioning as an electron sink, such as activated carbon particles activated to create and retain conjugated olefinic surface areas/sites, where the trinuclear-oxo basic metal acetate-stabilized complex can be chemically bonded through a dative donor ligand forming site on the activated carbon particle surfaces to facilitate electron density from the bound complex to the solid absorbent. In particular, the novel $[Fe_3(\mu_3\text{-}O)]$ core structure of the trinuclear-oxo basic iron (III) acetate-stabilized complex when chemically bound to active sites on the surface of porous activated carbon will form a molecular orbital structure between the complex and the activated carbon surface reactive site areas such that the surface can act as an electron sink for electron density within the overall molecular orbital structure. The trinuclear-oxo basic iron (III) acetate-stabilized complex retains its chemical and orbital structure in addition to formation of bonds with the activated carbon surface and facilitates selective chemical oxidation reactions for reduced sulfur ligands on the surface-bound complex. These would include reduced sulfur atoms such as those in mercaptan compounds, hydrogen sulfide and carbonyl sulfide compounds that are present within many vapor sources.

The present disclosure also provides a method and system for the treatment and removal of undesirable sulfur compounds such as, but not limited to, hydrogen sulfide ($H_2S$) mercaptan sulfur (R-SH) compounds, such as methyl thiol, ethyl thiol, propyl thiol, butyl thiol, as well as other branched and complex thiols that may be present as vapor in vapor phase natural gas, propane, butane, mixtures of propane and butane, fuel gases, waste gases, as well as many sources of atmospheric emissions.

According to another aspect of the present disclosure, a method of preparing a composition for the treatment of hydrocarbon streams and other streams comprising hydrogen sulfide and mercaptan sulfur species is provided. The method may include the preparation of specific transition metal compounds, for example aqueous acidic soluble trinuclear-oxo basic iron (III) acetate-stabilized cation, $[Fe_3(\mu_3\text{-}O)(CH_3CO_2^-)_6(H_2O)_3]^{+1}$, from iron (III) nitrate and/or iron (III) chloride hydrated salts and glacial acetic acid in a concentration-controlled and temperature-controlled acidic aqueous solution. This complex cation is an example of the "Inverse Coordination Chemistry" oxo class transition metal-based complexes that are known to oxidize reduced sulfur atoms in compounds, such as hydrogen sulfide, without decomposition.

The present disclosure provides novel procedures for surface wetting activated carbon particles such that a liquid solution contacts and establishes a continuous liquid phase over the targeted surfaces. An alcohol solvent is utilized as a component of the Soaking Solution to facilitate the desired surface distribution of the Reagent Complex in the Reagent Liquor component of the Soaking Solution. In each of the procedures, the aqueous acidic soluble trinuclear-oxo basic iron (III) acetate-stabilized cation, $[Fe_3(\mu_3\text{-}O)(CH_3CO_2^-)_6(H_2O)_3]^{+1}$ (also referred to herein as the reagent complex cation) in a Reagent Liquor is introduced to the activated carbon media in an amount to ensure that a sufficient amount of the Reagent Complex cation aligns with and associates with targeted activated carbon surface bonding sites.

The specific Soaking Solution application procedure utilized will depend on the compositional nature and surface chemistry of the specific type of activated carbon chosen, including particular types of activated lignite carbon (ALC).

The Soaking Solution is formed by controlled addition of alcohol, such as denatured ethanol, to the aqueous acidic Reagent Liquor containing the soluble oxo-based metal complex. The denatured ethanol may include 5% methanol and 5% isopropanol as denaturing agents. The first procedure is termed "Capillary/Soak" and utilizes a predetermined amount of Soaking Solution which is added directly to a given amount of the activated carbon using a spray system followed by short duration low intensity mixing/blending of the wetted activated carbon material. The amount of Soaking Solution added is controlled such that activated carbon particle pores are liquid-filled and related surfaces are liquid film wetted to the targeted level. The Soaking Solution is preferably added with minimum excess, i.e., the amount of Soaking Solution added is less than or equal to the capillary loading capacity of the activated carbon being utilized. Preferably, no free Soaking Solution is observed following after addition of the Soaking Solution and mixing, blending or tumbling to the active carbon media. This procedure is preferred when the surface properties of the activated carbon particles exhibit an adsorption attraction to the liquid Soaking Solution formulation that on contacting the Soaking Solution is drawn in the particle and any air present is displaced. Once the predefined Soaking Solution has been added, the wetted activated carbon particles are gently mixed, blended or "tumbled" to ensure effective distribution of the Soaking Solution. This may be accomplished in a batch or a continuous process.

The second procedure is referred to herein as the "Sequential Capillary Addition" procedure. In this procedure, no preformulated Soaking Solution is used. Rather, a predetermined amount of alcohol is added to the activated carbon media through a spray device. The procedure begins by placing a batch of dry activated carbon in a rotary mixer or ribbon blender. While the activated carbon media is slowly mixed/blended, a predetermined amount of alcohol is pumped into the mixer through a spray device using a metering pump. The amount of alcohol added is less than the amount that is capable of being loaded into or on the activated carbon. Once the alcohol has been absorbed and the activated carbon is uniformly mixed, an amount of Reagent Liquor is added to the mixer while the activated carbon is slowly mixed. Generally, the amount of Reagent Liquor added may be less than the amount of alcohol added to the mixer. Preferably, the amount of alcohol added is about 60%+5% of the liquid holding capacity of the activated carbon being utilized and the amount of Reagent Liquor added does not exceed the liquid holding capacity of the activated carbon. The amount of alcohol and the amount of Reagent Liquor added to the activated carbon is controlled such that no free inter-particle solution is present when the mixing is complete. For example, the amount of alcohol and the amount of Reagent Liquor added to the activated carbon is controlled such that a sieve drain test does not result in any observed liquid drainage.

In the Capillary/Soak and Sequential Capillary Addition procedures, the portion of the Soaking Solution retained within the particle bed, particle surfaces and pores are removed in a series of controlled drying stages such that the intact $[Fe_3(\mu_3\text{-}O)(CH_3CO_2^-)_6(H_2O)_3]^{+1}$ complex cation is distributed, aligned with, and deposited on activated carbon surfaces dative donor ligand forming sites. The drying stages are controlled such that the complex's surface binding orbitals are aligned with potential activated carbon dative donor ligand bond-forming surface areas. Following removal of substantially all of the delivery solvents (and nitric acid if present in the reagent liquor) that deposit and align the trinuclear-oxo basic acetate metal complex to potential bond-forming surface areas, process conditions are adjusted such that two of the complex's metal trans-out-of-plane ligand orbital sites become chemically bound through complex molecular orbitals to dative donor ligand bond-forming surface areas on the activated carbon surface yielding a molecular orbital bound neutral complex with a specific example being $[Fe_3(\mu_3\text{-}O)(CH_3CO_2^-)_6(H_2O)(\text{ACS-DDLB})_2]$.

The anions utilized to deliver the ferric ion to formulate the complex, nitrate ($NO_3^-$) from ferric nitrate and chloride ($Cl^-$) from ferric chloride, do not incorporate into and are not part of the BCT-AC formation process chemistry. The temperature of the drying stages may be adjusted when ferric nitrate is utilized such that the nitrate anion from the ferric nitrate is quantitatively removed by a combination of evaporation of nitric acid vapor ($HNO_3$) and thermal decomposition of nitrate to gaseous $NO_2$+NO. When using ferric chloride to deliver the iron for the complex synthesis, the majority of the chloride is removed as hydrochloric acid vapor in the drying stages with the remaining (if desired) chloride ions removed by a post-curing water wash.

The above-described activated carbon surface bound complex $[Fe_3(\mu_3\text{-}O)(CH_3CO_2^-)_6(H_2O)(\text{ACS-DDLB})_2]$ has the ability to facilitate the transfer of electron density from reduced sulfur ($S^{-2}$) ligands through the iron complex's molecular orbitals formed with the activated carbon surface. The complex molecular orbitals formed by bonding the complex's trans-out-of-plane orbitals with dative donor ligand bond-forming surface areas on the activated carbon particle surface provides a complex molecular orbital system linking the ligand's electron density through the $[Fe_3(\mu_3\text{-}O)]$ core to the activated carbon surface electron sink. The electron density transfer results in the conversion of the reduced sulfur ($S^{-2}$) ligand to elemental sulfur ($S^0$) ligand. Elemental sulfur formed at the bound complex site will result in elemental sulfur chains and rings which are then deposited and distributed near the bound complex site on the activated carbon surface. A unique feature of this activated carbon surface bound complex system is that it can convert vapor phase $H_2S$ to elemental sulfur ($S^0$) in a continuous vapor/gas phase stream. This is accomplished when vapor phase $H_2S$ contacts and becomes a ligand on the trinuclear-oxo basic iron (III) acetate-stabilized complex, which is bound to the activated carbon surface through molecular orbital bonding. This unique bonding results in a molecular orbital system that connects the complex's ligands to the activated carbon electron sink, facilitating electron density transfer from the reduced sulfur ($S^{-2}$) to the activated carbon surface. This reaction does not require additional reagents or process streams, as the complex's molecular orbital structure facilitates the electron density transfer and does not undergo the classical two-step REDOX process inherent in other complexed metal systems which require aqueous phases and the introduction of an oxidant stream to complete the REDOX cycle.

Additionally, in some aspects, the current disclosure also encompasses methods, systems, and compositions that use the activated carbon surface bound $Fe_2M(\mu_3\text{-}O)$ core molecular orbital structure to facilitate the removal of hydrogen sulfide, light thiols, and other undesirable sulfur compounds in gas/vapor phase compounds, wherein M selected from the group consisting of iron, cobalt, and vanadium. Preferably, the metal is iron, which more readily forms the triangular bond structure depicted in FIGS. **2*a*-2*d***. Interestingly, the compositions disclosed herein were found to oxidize hydrogen sulfide to form elemental sulfur. When the reduced sulfur ($S^{-2}$) in $H_2S$ interacts with the overall molecular orbital structure of the surface bound $Fe_3(\mu_3\text{-}O)$ based complex, it is oxidized through electron density transfer to elemental sulfur ($S^0$) without the potential to form sulfur oxides because the electron potential for this transfer isn't sufficient to oxidize the sulfur past its elemental form.

It is understood that the preferred core trinuclear-oxo structure $[Fe_3(\mu_3\text{-}O)]$ of the iron trinuclear-oxo basic acetate-stabilized complex cation $[Fe_3(\mu_3\text{-}O)(CH_3CO_2^-)_6(H_2O)_3]^{-1}$ may be formed utilizing either ferric nitrate, ferric chloride or a combination of the two salts as a source of the iron (III) required for chelation reaction with acetate anions delivered by an organic carboxylic acid ($RCO_2H$), such as glacial acidic acid ($CH_3CO_2H$). It is also understood that this reaction requires the maintenance of strong aqueous acid conditions from complex formation and throughout the overall process to distribute the complex cation and form the molecular orbital surface bound neutral complex that yields the BCT-AC product described herein. It is also understood that acidic aqueous solutions containing the core $[Fe_3(\mu_3\text{-}O)]$ molecular orbitals and supporting molecular structure can be formed utilizing organic carboxylic acids ($RCO_2H$) other than acetic acid, and in some cases these other carboxylic acids may yield specialized products when bound to or associated with specific activated carbon surfaces. It is also understood that similar "Inverse Coordination Chemistry" oxo class trinuclear basic acetate-stabilized complex can be formed with iron as a mixed metal complex utilizing cobalt or vanadium and utilized in a similar manner. It is also understood that mixed metal "oxo" complexes can be formed where one of the Fe molecules is replaced by a suitable transition metal such as cobalt or vanadium. It is also understood that a mixed complex cation $[Fe_2Co(\mu_3\text{-}O)(CH_3CO_2^-)_6(H_2O)_3]^{+1}$ can be formed in solution and deposited on or bound to an activated carbon surface to yield a bound complex that may have useful properties other than selective reduced sulfur oxidation in specialized applications.

One interesting aspect of this disclosure is that any set of transitional metals in the family of inverse coordination complexes that are known to form similar "oxo" stabilized complexes and that can be bound to the surface of an activated carbon media which form surface connected molecular orbitals can be used. For instance, iron, cobalt, vanadium, and combinations thereof can be used, but the core $[Fe_3(\mu_3\text{-}O)]$ molecular orbital structure is preferred for the formulation of BCT-AC media.

Another critical aspect of the formulation described herein is that the activated carbon surface dative donor ligand bound trinuclear-oxo basic iron (III) acetate-stabilized complex yields an electron transfer potential such that reduced sulfur cannot be oxidized past the "0" oxidation state and therefore, no sulfur oxides are produced. This provides a significant advantage over aqueous complexed metal REDOX systems. In these systems, if operational conditions are not carefully controlled, undesired acidic sulfur oxides may be formed during the oxygen driven regeneration step of the REDOX cycle. In processes utilizing the BCT-AC media, any vapor phase hydrogen sulfide may only be converted to elemental sulfur and accumulated on the activated carbon surface. The vapor phase thiols will be converted to higher boiling disulfides and accumulated on the same activated carbon surface, and carbonyl sulfide (COS) if present will be oxidized to elemental sulfur and CO. The controlled sulfur oxidation reaction sequence that occurs in the BCT-AC media system does not require the utilization of aqueous caustic or the addition of oxygen containing gas streams to facilitate reduced sulfur as required in classical REDOX processes such as aqueous alkaline soluble chelated iron based SULFEROX and aqueous alkaline vanadium+anthraquinone disulfonic acid (ADA) solution-based STRETFORD.

The first step in BCT-AC formulation is the utilization of an acidic aqueous solution that includes the soluble tri-nuclear-oxo basic metal $Fe_2M(\mu_3\text{-}O)$ acetate-stabilized complex cation. The formulated acidic aqueous solution is referred to as the "Reagent Liquor" in the BCT-AC media formulation. Reagent Liquor is formulated by dissolving a selected amount of a metal nitrate salt (e.g., hydrated iron (III) nitrate salt) or a metal chloride salt in water (e.g., RO/DI water) followed by addition of an organic acid (e.g., glacial acetic acid) ratioed to a controlled excess of the molar amount of the total metals utilized.

This mixture is diluted with additional water to yield the desired Reagent Liquor metal complex concentration and heated to ensure that the complex formation is achieved. The Reagent Liquor may be heated at a temperature of up to about 80° C. for up to about 2 hours. The complex has the molecular structure of $[Fe_2M(\mu_3\text{-}O)(CH_3CO_2^-)_6(H_2O)_3]^{+1}$ $[\text{Anion}]^{-1}$. The anion may be either $NO_3^-$ or Cl" depending on the metal salt starting material. In a preferred example, the metal is Iron (III) and the complex cation is $[Fe_3(\mu_3\text{-}O)$ $(CH_3CO_2^-\%\ (H_2O)_3]^{+1}$.

The second step in BCT-AC formulation is the selection of an activated carbon media with surface properties that allow formation of stable dative donor ligand bonds between the activated carbon surface and trans-out-of-plane orbitals of the reagent complex binding it to the activated carbon surface. This selection is critical in that not only must its surface have unsaturated olefinic defects that can form dative donor ligand bonds with the complex, which provide stable surface binding of the complex, but the molecular orbitals that are formed between the surface and the complex must be capable of transferring electron density from a non-surface bound complex ligand site to be dissipated on the activated carbon surface without chemically degrading the bound complex. It is understood that surface chemistries of the selected activated carbon particles, while capable of forming the desired complex surface bonding, may have additional properties which may require process and/or procedural modifications to achieve the desired BCT-AC product performance. The preferred activated carbon media is an activated lignite carbon (ALC) produced from lignite coal, such as HOK® or Norit®. HOK® is activated lignite made from Rhenish lignite mined in Cologne, Germany, and is particularly preferred for the vapor treatment processes described herein. It is understood that surface of these activated carbons must be acid-washed to ensure pore and surface conditions are acidic and to remove residual surface ash. The acid-washed product must be processed such that when contacted with deionized water a pH between 3.5-6.5 is observed, with 4-5 being desired.

The preferred activated carbon particle sizes used for liquid or gas phase applications may have a particle size from about 4 mesh (4.76 millimeters) to about 40 mesh (0.420 millimeters), or from about 0.50 millimeters to about 2.50 millimeters, or from about 0.36 millimeters to about 2.00 millimeters, or from about 0.36 millimeters to about 1.50 millimeters, or from about 0.46 millimeters to about 1.25 millimeters, or from about 1.00 millimeters to about 2.00 millimeters, or from about 0.60 millimeters to about 1.25 millimeters.

The preferred activated carbon particles may also have an internal pore surface area of from about 200 $m^2/g$ to about 1200 $m^2/g$, or from about 360 $m^2/g$ to about 700 $m^2/g$, or from about 500 $m^2/g$ to about 700 $m^2/g$, or from about 150 $m^2/g$ to about 300 $m^2/g$, or from about 625 $m^2/g$ to about 1200 $m^2/g$. The particles may also have a total pore volume from about 0.15 to about 0.25 ml/g, or from about 0.60 to about 1.0 ml/g, or from about 0.46 to about 1.200 ml/g.

The third step in BCT-AC formulation is the delivery of the trinuclear-oxo basic iron (III) acetate-stabilized complex cation (also referred to herein as the "reagent complex cation") present in the Reagent Liquor to the potential chemical binding ligand forming sites on the activated carbon media. This may be accomplished by one of two procedures each with their own physical chemistries, operational sequences, and process hardware systems. Those having ordinary skill in the art will appreciate that the choice of procedure may be influenced by the compositional nature of the activated carbon and optimization of process economics. The two complex delivery processes are each liquid solvent based. They are Capillary/Soak Addition, and Sequential Capillary Addition. These processes are described in more detail further hereinabove.

In the Capillary/Soak Addition process, a Soaking Solution is formulated through the controlled addition of alcohol, such as denatured ethanol, to the Reagent Liquor which is then added to the activated carbon through a liquid spray system while the media is tumble mixed in a suitable device, such as a rotary mixer. The ratio of the alcohol to the Reagent Liquor may be chosen based on the properties of the activated carbon and the desired loading of the Reagent Complex for the BCT-AC product. In general, a ratio of about 65:35 (alcohol to Reagent Liquor) to about 55:45 (e.g., 60:40) is preferred for the Capillary Soak procedure. In the Sequential Capillary Addition process, a pre-blended Soaking Solution is not formulated; rather, a predetermined amount of alcohol is added to the activated carbon through a liquid spray system while the media is tumble mixed in a suitable device, such as a rotary mixer. The alcohol is added first at about 60%+5% of the liquid holding capacity of the activated carbon followed by addition of the Reagent Liquor up to, but not to exceed, the liquid holding capacity of the activated carbon. The liquid holding capacity of the activated carbon may be determined experimentally through methods known to those having ordinary skill in the art.

The fourth step in BCT-AC formulation of the BCT-AC media formulation is complete removal of the alcohol and water delivery solvents and the anions used to formulate the Reagent Liquor from the wetted activated carbon particles forming the wetted media bed. The anions may be present as neutral nitric acid, hydrochloric acid, nitrate anions, or chloride anions. This is accomplished through controlled relative humidity evaporation utilizing one or more hot air dryers. The hot air dryer blows forced hot air over and through the activated carbon media to facilitate evaporative drying of the wetted activated carbon. One or more hot air dryers may be used. Air temperatures and air volumes utilized in the hot air dryer may be controlled in one or more steps depending on the hardware utilized. The air temperatures and air volumes may be adjusted to allow quantitative solvent removal from the activated carbon. The air temperature may be from 165° F.-250° F., with 200-220° F. preferred. and operated such that the applied air temperature does not exceed 250° F. Those having ordinary skill in the art will be capable of adjusting operational parameters such as flow rate and air temperature to achieve this result. A critical aspect of this process step is the alignment of the reagent complex cation to the dative donor ligand bonding sites on the activated carbon media surface. This is accomplished through controlled evaporative removal of the liquid phase solvents that allow the complexes to align via the electrostatic attraction (hydrogen bonding/Van der Waals forces) of the reagent complex cation trans out-of-plane orbitals with the dative donor ligand bonding sites to the activated carbon media's olefinic surface sites.

An additional step in BCT-AC formulation of the BCT-AC media may be required if ferric nitrate salt utilized to formulate the Reagent Liquor is present in excess and has not been quantitively evaporated as neutral nitic acid in previous process steps. It is required to completely remove any residual nitrate anions that may be present on the solvent-dried activated carbon media surface prior to curing. As discussed above, the formulation of Reagent Liquor when utilizing ferric nitrate results in the presence of both nitric acid and residual nitrate anion. Removal of the residual nitrate is accomplished through decomposition of nitrate anion to gaseous nitrogen dioxide and nitrous oxide ($NO_2$+NO) on the activated carbon surfaces at temperatures of about 200° F. to about 220° F., or greater. Preferably, the temperature is maintained below 220° F. because at temperatures greater than 250° F., gaseous $NO_2$ has the potential to oxidize the reagent complex cation which may degrade some portion of the trinuclear-oxo basic iron (III) acetate-stabilized complex and reduce the treating capacity of the BCT-AC product. This step utilizes a hot air dryer where air temperatures are maintained below 220° F., and air flow volumes are adjusted to allow quantitative removal nitrate as $NO_2$ such that the temperature of the activated carbon media may not exceed 220° F. Those having ordinary skill in the art will be capable of adjusting operational parameters such as flow rate and air temperature to achieve this result.

The final step in BCT-AC formulation is the chemical binding of the deposited and aligned Reagent Complex cations through trans-out-of-plane complex orbitals to activated carbon media surface dative donor ligand bonding sites. If the complete chemical bonding has not been accomplished with the activated carbon media being utilized in previous process steps, as determined by an alcohol extraction color test, the complete chemical bonding can be accomplished by raising the surface temperature of the activated carbon media to about 245° F. to about 250° F., thereby providing activation energy to allow the water molecules present on two of the Reagent Complex's trans-out-of-plane ligand sites to be displaced and resulting in the formation of molecular orbital chemical bonds between the complex and surface binding sites. The resulting molecular orbital system provides a path, when the electron potential allows, for electron density to flow from that ligand site to the activated carbon surface electron density sink. The e°V potential between the reduced sulfur ($S^{-2}$) in $H_2S$ and the activated carbon media allows $H_2S$ when present on the non-surface bound third ligand site to be oxidized to elemental sulfur. This process is illustrated in FIGS. 2*a*-2*e*.

This process results in the formation of stable molecular orbitals connecting the complex with the activated carbon surface electron sink and yields stable chemical bonding between the complex and the activated carbon surface. The molecular orbital bound complex has different properties than the in-solution metal complex cation, which is a soluble "free" cation when in acidic aqueous solutions. In preferred embodiments using the trinuclear-oxo basic iron (III) acetate-stabilized complex, the activated carbon surface molecular orbital bound complex's structure may be viewed as a neutral, with two of the iron ligand sites becoming surface-chemically-bound, yielding an activated carbon surface functional group with the general composition $[Fe_3(\mu_3\text{-}O)(CH_3CO_2^-)_6(H_2O)\ (ACS\text{-}DDLB)_2]$ where ACS-DDLB=activated carbon surface dative donor ligand bonds bound to the trinuclear-oxo basic iron (III) acetate-stabilized complex. When the complex's core structure is surface bound through dative donor bonds to trans-out-of-plane complex orbitals, the surface binding sites become stable complex ligands resulting in true chemical binding to the activated carbon surface.

Figure 2A:
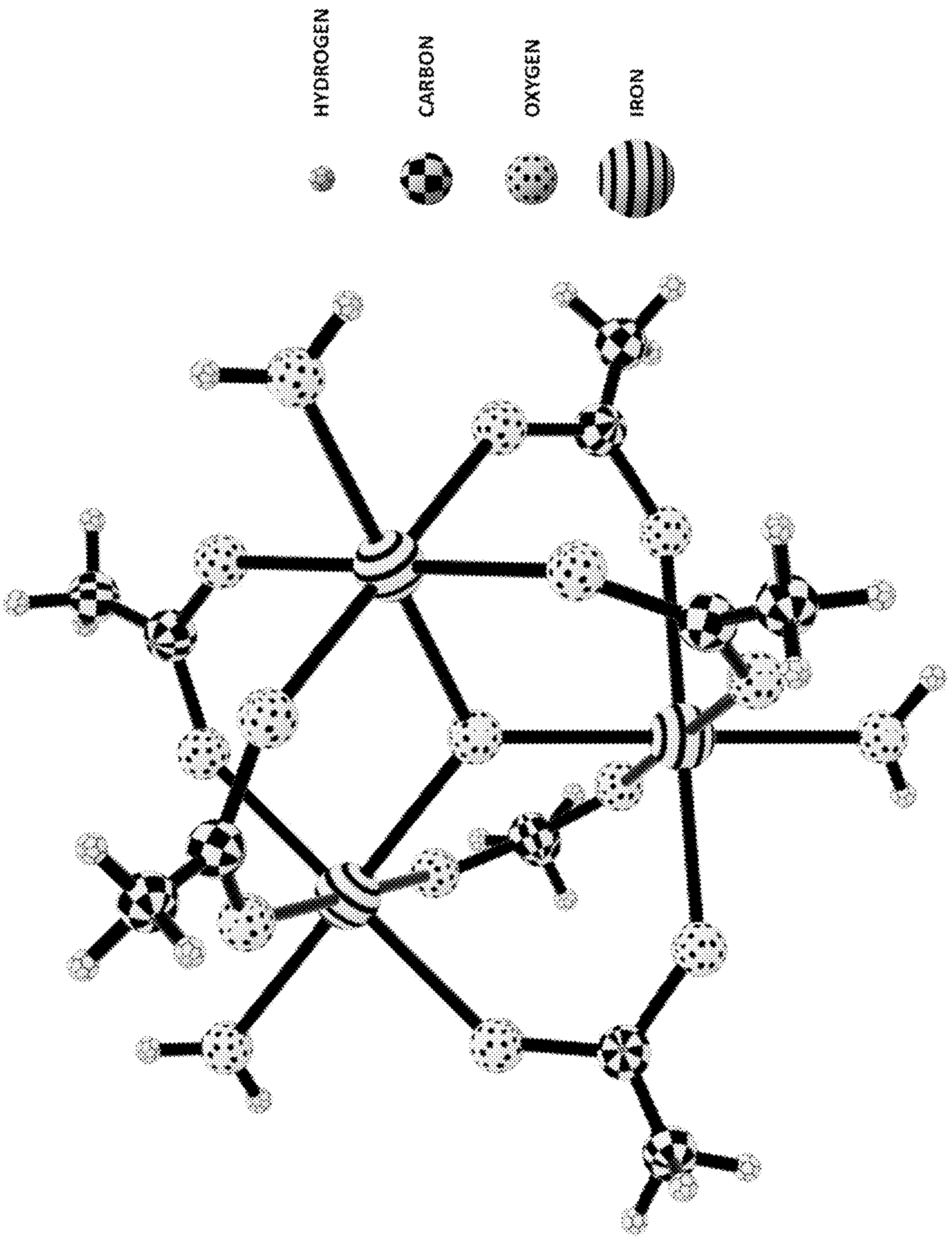
FIG. 2*a* depicts the 3D-X-Ray Crystallography generated molecular structure of the preferred Trinuclear-oxo Basic Iron (III) Acetate stabilized coordination complex cation as the complex's structure would exist in an acidic aqueous solution.

The in-solution complex cation, $[Fe_2M(\mu_3\text{-}O)(CH_3CO_2^-)_6(H_2O)_3]^{+1}$, may be precipitated as a salt by concentration in the presence of a suitable anion, such as nitrate or chloride anions. These salts may be deposited onto activated carbon or other surfaces or grown out of solution as solid-state salt crystals, i.e. deposited on a surface, but not chemically bonded. When grown as single crystals they can be structurally characterized by X-Ray crystallography yielding acute bonding structures as shown in FIG. 2*a*. In this state, the complex is soluble in alcohol and aqueous acid and if deposited but not chemically bound, they can be easily removed from an activated carbon particle surface through solvent extraction. The solvent may include an alcohol, acetone, MEK, or similar oxygen-based polar solvents. In addition, the deposited (but not chemically bound) complex will not facilitate the oxidation of either sulfide or thiol reduced sulfur. Once chemically bound through molecular orbitals of the $[Fe_2M(\mu_3\text{-}O)]$ core structure to the active sites on the activated carbon surface, the complex becomes insoluble in aqueous acid and alcohol, acetone, MEK, or similar oxygen-based polar solvents.

An additional critical property of the molecular orbital system formed by the shared oxygen in the $[Fe_2M(\mu_3\text{-}O)]$ core structure of the bound complex molecule is that the molecular orbital system allows electron density to flow through the trans-out-of-plane complex's molecular orbitals through the oxo ($\mu_3$-O) linkage from a reduced sulfur atom to the activated carbon surface conjugated olefin-generated electron density sink. The direction and flow of electron density is driven by the electron potential difference between the reduced sulfur e°V in hydrogen sulfide and the activated carbon surface electron potential. The complex's molecular orbitals act as an electron density transfer pathway, rather than a classical two-step multiagent REDOX catalyst.

The complex's molecular orbitals also act as an electron density transfer pathway for the conversion of vapor phase thiols to liquid disulfides. This is generally referred to as a sweetening reaction (RSH→RSSR) where thiols are oxidized to (RS*) and disulfides are formed through the reaction of a second RSH rather than further oxidized to elemental sulfur or sulfur oxides. This is a more complex and slower reaction than that of hydrogen sulfide oxidation to elemental sulfur as the thiol to disulfide chemistry is converting two molecules to one. The BCT-AC media has a process advantage over most standard "overall multistage" REDOX processes, as no step in the BCT-AC chemistry includes conditions that will not break the sulfur-carbon bond and generate undesired sulfur oxide by-products. The sweetening reaction proceeds in two steps where the vapor phase thiol containing the reduced sulfur ($RS^{-2}H$) is coordinated to the non-bonded trans-out-of-plane ligand site. When bound as a ligand, two units of electron density are transferred to the activated carbon surface as with the hydrogen sulfide ligand, but due to the stability of the C-S bond a free radical thiol molecule (RS*) and not elemental sulfur is formed. The thiol free radical remains coordinated to the complex's ligand site until it is contacted by a second thiol (RSH), whereby an Sn2 reaction yields a disulfide composed of the two interacting species. A characteristic feature of this reaction is that it yields every possible combination of mixed disulfides based on their relative concentration in the vapor being treated. An RSSH molecule is not generated due to its instability and the much faster reaction kinetics of hydrogen sulfide. All of the targeted disulfides have sufficiently high boiling points that they are deposited and retained on the activated carbon surface.

It has been unexpectedly discovered that when the tri-nuclear-oxo basic iron (III) acetate-stabilized complex is bound to the surface of activated carbon via molecular orbital bonding through surface reactive sites, reduced sulfur atoms in $H_2S$ and thiols produce elemental ($S^0$) sulfur and disulfides at the ligand site. Therefore, when hydrogen sulfide is oxidized to elemental sulfur, the elemental sulfur atoms remain as a ligand on the complex and are deposited on the activated carbon surface when elemental sulfur chains and rings are formed. The same is true for any thiols converted to disulfides. Once the trinuclear-oxo basic iron (III) acetate-stabilized complex cation is bonded to the surface sites, the resulting neutral surface bound complex is stabilized such that it is not subject to removal by hydrocarbon solvents or aqueous solvents. Thus, the formed elemental sulfur, while not directly deactivating the chemically bound complex's electron density transfer activity, will over time diminish the capacity for hydrogen sulfide treatment by restricting vapor phase $H_2S$ access to bound complex reaction sites.

As disclosed herein, hydrocarbon solvents capable of solubilizing elemental sulfur and disulfide surface foulants may remove the foulants. The hydrocarbon solvents may include toluene, xylenes, benzene, or other aromatic hydrocarbons. Additional solvents may include carbon disulfide. Preferably, the solvent includes toluene or xylenes. The vessel containing the fouled BCT-AC media may be isolated from vapor flow by utilization of two or more vessels in a lead/lag configuration as illustrated in FIGS. 4*a*-5*c*. Once isolated and depressurized, the solvent may be passed through the fouled BCT-AC bed, as shown in FIGS. 4*a*-5*c* and collected for regeneration through removal and recovery of the sulfur and disulfides from the post media bed extraction. Solvent contacting and recovery may continue until the desired degree of foulant removal from the bed is achieved.

The removal of the elemental sulfur and disulfide foulants through the above solvent extraction restores the capacity of the BCT-AC media without diminishing its original reactivity and capacity.

The BCT-AC media disclosed herein are useful in treatment of hydrogen sulfide from hydrocarbon gas/vapor, light condensate, and mixed vapor streams. When the reduced sulfur ($S^{-2}$) in $H_2S$ becomes a ligand on the non-surface bonded trans out-of-plane complex ligand site and interacts with the overall bonded [$Fe_2M(\mu_3\text{-}O)$] based complex, it is oxidized to S° (elemental sulfur), without potential to form sulfur oxides. This is accomplished through electron density transfer from the reduced sulfur present as a ligand on a surface bound complex through the molecular orbitals of the chemically surface bound complex to the electron sink created when the complex forms ligands with conjugated olefinic areas on activated carbon surfaces. In addition to facilitating the electron density transfer oxidizing the reduced sulfur, the conjugated olefinic surface structure's overall molecular orbitals allow the transferred electron density to be dissipated throughout the media surface and maintain transfer capacity for additional reactions through the same reactive site.

A critical link in the overall transferring complex molecular orbital structure is facilitated through a special property of the bound [$Fe_3(\mu_3\text{-}O)$] cluster whose molecular structure from the iron hybridized orbitals through the connected oxo orbitals provides a resonance pathway between the reduced sulfur occupying the trans out-of-plane iron orbital and the activated carbon surface dative donor ligand bonding orbitals of the other two iron trans out-of-plane iron ligand orbitals.

An exemplary embodiment of the treatment system includes a vapor stream that contains at least one or more hydrogen sulfide or vapor phase thiol molecules that is fed into a BCT-AC media treatment contactor, wherein the BCT-AC media treatment contactor can be a carbon steel-constructed vessel. In some aspects, the vessel may be made of any corrosion resistant material including but not restricted to steel, carbon steel, stainless steel, titanium, titanium alloys, nickel alloys, hastelloy, tantalum and other suitable alloys based on the application parameters. In some aspects the vessel may be made of plastics such as polyethylene, polypropylene, PVC, CPVC, fiberglass, fiberglass reinforced plastics and/or resins, as just some examples of commonly used plastics. In this configuration of the BCT-AC treatment contactor an orifice or inlet is used to direct the flow of the gas stream into the BCT-AC treatment contactor. Within the BCT-AC treatment contactor, an amount of BCT-AC media is positioned to come in contact with at least some of the vapor stream containing the hydrogen sulfide or thiol molecules as part of its composition, such that the molecules of hydrogen sulfide or thiol come in contact with the BCT-AC media that includes surface bound trinuclear-oxo basic iron (III) acetate-stabilized complex, such that the hydrogen sulfide or vapor phase thiol molecules may become a ligand at the non-surface bound iron octahedral hybridized ligand sites allowing for at least some of the treated vapor stream to exit the BCT-AC treatment system with less hydrogen sulfide and/or less thiol molecules as part of its composition.

Importantly, the presently disclosed compositions are effective for the treatment of hydrogen sulfide, thiols/mercaptan species and carbonyl sulfide from vapor/gas streams absent of the use of alkaline or caustic solutions. In particular, the presently disclosed compositions are capable of treating specified sulfur species from vapor/gas streams without exposing or saturating the disclosed composition to a caustic solution or aqueous phase to drive the core chemistries. The core chemistry, related to removal of the target sulfur compounds is driven by the sulfur compound being deposited from the gas/vapor phase onto the BCT-AC media as a surface foulant.

In some aspects the systems disclosed herein may comprise multiple BCT-AC media treatment contactors, allowing for the continuous treatment of hydrocarbon sources as well as concurrent regeneration of fouled BCT-AC media treatment contactors, wherein the fouled BCT-AC media treatment contactors may be offline with respect to the vapor phase treatment system but online with respect to a solvent regeneration system.

An exemplary embodiment of a treatment system includes a gas or vapor stream that contains at least one or more hydrogen sulfide or vapor phase thiol molecules that is fed into a BCT-AC media treatment contactor. In some aspects, the vessel may be made of any corrosion-resistant material including but not restricted to steel, carbon steel, stainless steel, titanium, titanium alloys, nickel alloys, hastelloy, tantalum and other suitable alloys. In some aspects, the vessel could be made of plastics such as polyethylene, polypropylene, PVC, CPVC, fiberglass, fiberglass reinforced plastics and/or resins, as just some examples of commonly used plastics. In this configuration of the BCT-AC treatment contactor an orifice or inlet is used to direct the flow of the gas stream into the BCT-AC treatment contactor. Within the BCT-AC treatment contactor, the BCT-AC media is positioned to come in contact with at least some of the vapor stream containing the hydrogen sulfide or thiol molecules as part of its composition, such that the molecules of hydrogen sulfide or thiol come in contact with the BCT-AC media, such that the hydrogen sulfide or vapor phase thiol molecules may directly ligand bond with the non-surface bound iron octahedral hybridized ligand sites allowing for at least some of the treated vapor stream to exit the BCT-AC treatment system with less hydrogen sulfide and/or less thiol molecules as part of its composition.

In at least one aspect of the present disclosure, the aqueous acidic trinuclear-oxo basic iron (III) acetate-stabilized complex cation $[Fe_3(\mu_3\text{-}O)(CH_3CO_2^-)_6(H_2O)_3]^{+1}$ may be synthesized using an iron salt selected from one of two of the commercially available hydrated Iron (III) salts. These are ferric nitrate, $[Fe^{+3}(NO_3^-)_3\text{-}nH_2O]$, preferably n=9 or nonahydrate and ferric chloride, $[Fe^{+3}(Cl^-)_3\text{-}nH_2O]$, preferably n=6 or hexahydrate, as the starting material.

In one such embodiment, the synthesis of the aqueous acidic soluble trinuclear-oxo basic iron (III) acetate-stabilized cation $[Fe_3(\mu_3\text{-}O)(CH_3CO_2^{-}")_6(H_2O)_3]^{+1}$, is carried out using an aqueous solution of hydrated ferric nitrate salt heated to 40-50° C. with mixing until it yields a clear & bright aqueous acid solution containing hydrated iron $[Fe^{+3}(H_2O)_6]^{+3}$ cations charge balanced by nitrate $[NO_3^-]$ anions. In a similar embodiment, the synthesis may be carried out in a similar manner starting with the hydrate ferric chloride salt. The trinuclear-oxo basic iron (III) acetate-stabilized complex cation is then synthesized through controlled addition of glacial acetic acid reagent to the above heated solution containing the hydrated iron $[Fe(H_2O)_6]^{+3}$ cations. The glacial acetic acid reagent addition is controlled such that it is in molar excess (e.g., 10-25%) of that required by the stoichiometry of the complex cation formation. The resulting mixture is heated to 60-90° C. (with the preferred end temperature being 80° C.) and held for 2-8 hours. The mixture is then allowed to cool to ambient temperature. This aqueous acid soluble complex cation-containing solution is now chemically stable and be stored for later process utilization.

According to at least one aspect of the present disclosure, the solid media substrate may be comprised of an acid washed activated carbon, with the preferred media being activated lignite carbon (ALC) with particle surfaces containing unsaturated olefinic defects. An example of activated carbon is an acid washed lignite-based activated carbon (AW-ALC) with targeted surface properties produced from USA gulf coast lignite. Another example is a commercial acid washed activated German lignite material containing similar targeted surface properties, trade name "Activated Lignite HOK". Those having ordinary skill in the art will be capable of determining a selective mesh size for the target application.

The surface acid wash is a critical step relative to BCT-AC media product formulation. The AW-ALC media chosen has a requirement that a distilled water wash yield a solution pH between 3.5-6.5 with a desired target of pH of 4-5. In at least some instances, the BCT-AC media product may be formulated from AW-ALC generated from a non-USA gulf coast lignite-based coal or produced from carbon-rich precursor materials including but not restricted to humate, brown coal, jet, bituminous coal, anthracite, sub-bituminous coal, lignite, wood, peat and variations and combinations thereof and processed to yield pore properties consistent with the claims here within. It has been discovered that AW-ALC that is suitable for BCT-AC formation in the trinuclear-oxo basic iron (III) acetate-stabilized complex can be surface-bound to yield the targeted reactions may have differing surface properties that require different Soaking Solution contacting procedures. However, the two preferred AW-ALC listed above may be effectively processed utilizing either the Capillary/Soak or Sequential Capillary Addition procedures discussed above. Those having ordinary skill in the art will understand that different activated carbon media, while capable of forming the chemical bonds required to formulate the targeted BCT-AC product, may have surface properties that may require some variations in the process steps and procedures stated herein.

It will be understood by one of skill in the art that other embodiments could be developed using other solid medias with similar surface characteristics as the activated carbon for the formation of a surface bound metal complex of the present disclosure, and such solid medias are within the scope of the present disclosure. It will be further understood by one of skill in the art that other embodiments could include the formation of a stable surface bound metal complex of the present disclosure on other medias with formation of molecular orbitals consistent with facilitating electron density transfer. It will be further understood to one of skill in the art that other embodiments may be developed using other solid medias for the formation of a surface-deposited oxo-metal complex of the present disclosure that may not facilitate electron density transfer but may be bonded to the surface of the media such that they could still be functional as a single-use product.

Additionally, it is understood that the concentration of the metal complex may be increased by adding additional Soaking Solution to previously formulated BCT-AC media by either the Capillary/Soak Addition or Sequential Capillary Addition process described above, and the formation process is repeated. The second, and subsequent, cycles of treating previously formulated and cured BCT-AC product through one or more additional Soaking Solution additions and thermal bonding steps will increase the concentration and distribution of electron transfer sites on the activated carbon media surfaces. It is further understood that the metal complex present in the starting and subsequent Soaking Solutions may be presented at equal or differing concentrations and/or the Alcohol/Reagent Liquor ratios may differ to achieve the desired concentration of the stable surface bound metal acetate-stabilized complex.

In an embodiment, the surface bound trinuclear-oxo basic iron (III) acetate-stabilized complex $[Fe_3(\mu_3\text{-}O)(CH_3CO_2^-)_6(H_2O)\ (ACS\text{-}DDLB)_2]$ may be used to quantitatively convert gas phase hydrogen sulfide to solid phase elemental sulfur through electron density transfer to the activated carbon media surface sites. Once the reduced sulfur atom $(S^{-2})$ has been oxidized to elemental sulfur $(S^0)$ it is retained as a ligand and is then displaced as additional elemental sulfur is formed, resulting in chains and rings that can no longer function as a ligand, which are then displaced and deposited on the activated carbon surface. Thus, the BCT-AC electron density transfer oxidation properties can be used to oxidize hydrogen sulfide quantitatively and selectively in gas phase applications to elemental sulfur without extensive aqueous phase chemistries and complex processes as with currently used technologies. Additionally, the elemental sulfur chains and rings that have been deposited on the activated carbon surfaces are non-chemically bound foulant and can be removed through physically washing the fouled BCT-AC media bed with an appropriate organic solvent, effectively regenerating the BCT-AC product's hydrogen sulfide oxidation properties. This can be accomplished using standard hydrocarbon solvents with appropriate sulfur solubility, physical properties, and compatible with physical contacting processes. For example, the presently disclosed composition, without the need of an aqueous caustic phase or without the need for additional chemical reagents, may be used to extract and convert hydrogen sulfide to elemental sulfur from natural gas streams ahead of liquified natural gas export facilities.

In another embodiment, vapor phase thiols may be removed from a gas phase utilizing the presently disclosed BCT-AC media product. The BCT-AC media product may quantitatively convert, through oxidation, vapor phase reactive mercaptan (R-S-H) sulfur compounds, into condensed oxidized disulfide (R-S-S-R) compounds, a non-reactive hydrocarbon soluble sulfur compound, without the need of an aqueous caustic phase. For example, the presently disclosed compositions and methods may be effective for the conversion of vapor phase butyl mercaptan ($C_4H_9SH$) directly into butyl disulfide ($C_4H_9SSC_4H_9$) with retention of the disulfide on the activated carbon surfaces and regenerated by the above disclosed hydrocarbon solvent extraction wash. The presently disclosed compositions may also be used to convert small volatile vapor phase mercaptans ($C_{1-3}SH$), such as methyl mercaptan ($CH_3SH$) into dimethyl disulfide ($CH_3SSCH_3$). In this embodiment, the disulfide hydrocarbon is retained on the surface of the activated carbon media until it is extracted/removed using a hydrocarbon fluid, as is the process for removal of elemental sulfur fouling.

Figure 5A:
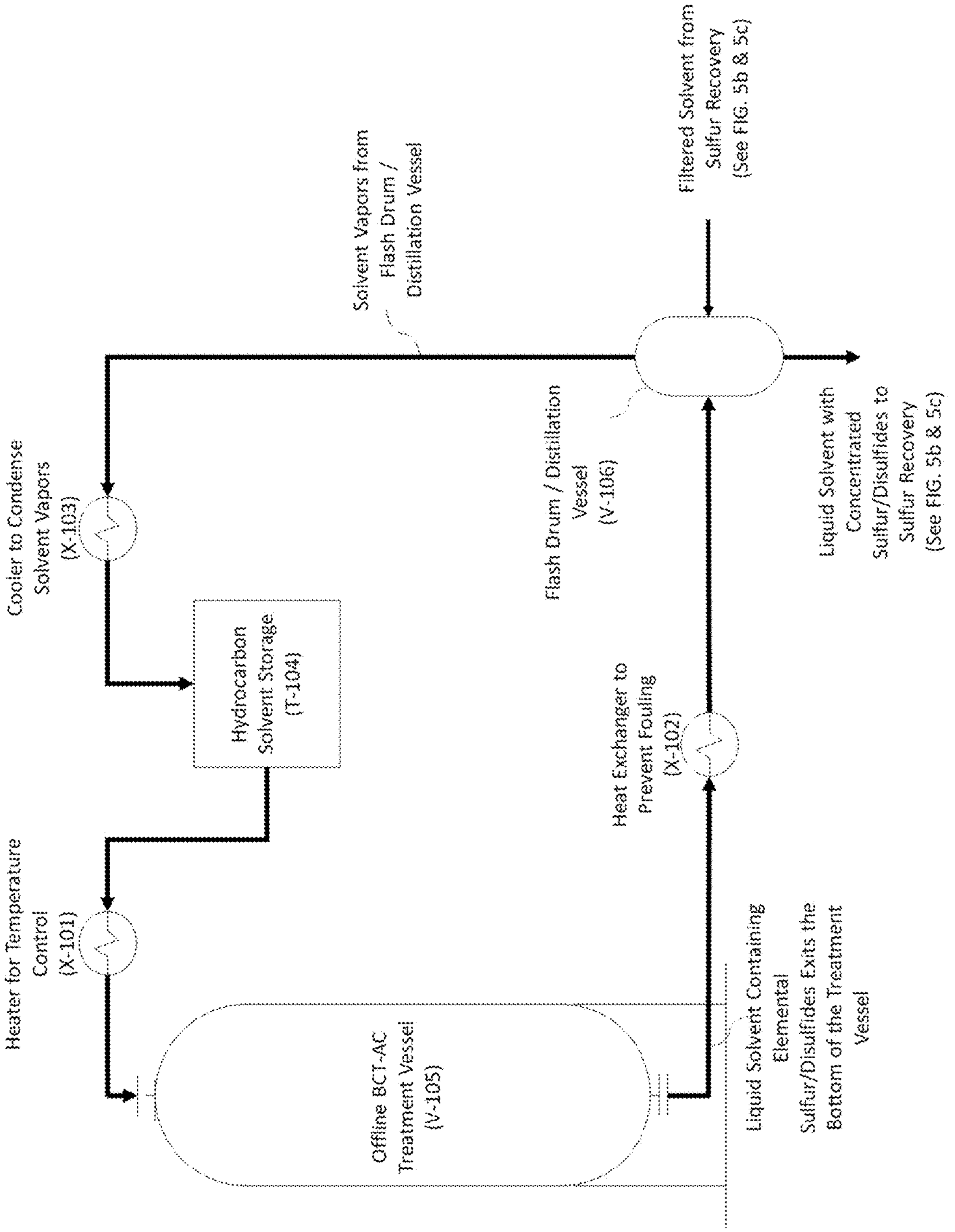
FIG. 5*a* depicts a schematic of continuous regeneration system such that the removed foulants are recovered and isolated before the bulk of circulating solvent is recovered by distillation and recycled back to the fouled vessel. In this embodiment, the extraction solvent flow is value engineered to be "top-down", but it is understood that some applications may be configured "bottom-up".

With reference to FIG. 5*a*, the in-situ regeneration system is used to regenerate the fouled BCT-AC media in vessel V-105. A liquid hydrocarbon solvent (also referred to herein as the "extraction solvent" or the "extraction mobile phase solvent") stored in tank T-104 is delivered to vessel V-105. A heat exchanger X-101 may be used to increase the heat of the solvent before delivery to vessel V-105. The solvent may include carbon disulfide or a hydrocarbon solvent such as toluene, xylenes, benzene, or other hydrocarbons. Toluene and/or xylenes are preferred solvents due to their relatively high sulfur solubility and handling characteristics, allowing the static solvent in the media to generate high localized concentrations, which drives the diffusion from the static media bed to the extracting solvent mobile phase passing through the BCT-AC media bed vessel V-105, thereby removing the foulant from the static media bed through concentration driven diffusion. The flow rate of the extraction solvent moving through the BCT-AC media bed is managed/controlled such that the extraction solvent remains sufficiently lean to drive the foulant diffusion from the static solvent within the media into the mobile phase extraction solvent, and thereby carrying the foulant out of the BCT-AC media bed. As the foulant is quantitatively extracted from the particles, a portion of the extraction solvent coats the particles and fills the pores of the BCT-AC media. This portion of the solvent is referred to herein as the "static" solvent. The localized soluble foulant concentration in the static solvent allows dissolved surface foulants to diffuse into the extraction mobile phase solvent, thereby allowing the dissolved foulant material to be removed from the BCT-AC treatment vessel V-105 and recovered as a soluble component of the sulfur-enriched extraction mobile phase solvent. As additional volumes of the "once through" extraction mobile phase solvent is passed through the vessel's BCT-AC media bed, the concentration of the soluble foulant on the particle surfaces and in the pore volume liquid is decreased.

The sulfur-enriched mobile phase solvent may pass through a heat exchanger X-102 to ensure the elemental sulfur remains dissolved in the mobile phase solvent before entering the flash drum V-106. The sulfur-enriched extraction mobile phase solvent is then delivered to a flash drum V-106 to evaporate at least a portion of the solvent and provide a concentrated solution of sulfur and disulfides, which may then be recovered. The solvent vapors and entrainment exiting the flash drum may be condensed and recycled to the mobile phase solvent storage tank T-104 for reuse. The solvent vapors and entrainment may contain less than about 0.1 wt % of sulfur.

As discussed above, the loss of treating activity for the surface bound trinuclear-oxo basic iron (III) acetate-stabilized complex of the BCT-AC media is primarily due to localized fouling near the complex's bonding site due to accumulation of the produced elemental sulfur chains and rings. An additional embodiment of this invention is that when an amount of foulant sulfur has been removed from the fouled vessel's BCT-AC media bed, the remaining foulant elemental sulfur is dissolved in the remaining static extraction solvent. When the remaining static solvent is removed by evaporation at the completion of the regeneration cycle, the remaining sulfur dissolved in the retained solvent will be distributed across the whole of the BCT-AC media particle's surfaces and no longer be concentrated in the localized area of the surface bound trinuclear-oxo basic iron (III) acetate-stabilized complex, further reducing the impact of any residual elemental sulfur on treating efficiency. A hydrocarbon solvent, such as toluene or xylenes, may then be pumped bottom-up through the fouled BCT-AC media bed in the vessel and recovered in an "elemental sulfur enriched" extraction solvent recovery vessel. The recovered elemental sulfur enriched extraction solvent can then be processed to remove and recover the extracted elemental sulfur yielding an "elemental sulfur lean" extraction solvent suitable for recycle reuse in additional fouled vessel regeneration cycles. It will be understood to those having ordinary skill in the art that the direction of the extraction solvent flow through the bed can be a function of specific hardware configurations and the extraction chemistry can be effectively managed in either flow direction.

An additional embodiment is the utilization of a foulant removal process for the fouled BCT-AC media bed where the extraction solvent is continuously recycled through the "off-line" bed until the desired degree of foulant removal has been achieved. In this design approach extracted foulant elemental sulfur is removed and recovered in a continuous process that generates an "elemental sulfur lean: solvent-fed stream to the sulfur-fouled vessel, recovers the foulant elemental sulfur enriched extraction solvent and removes, on-site, the elemental sulfur, thereby regenerating in a continuous closed loop cycle the lean solvent that can then be routed back to the vessel. A process flow diagram for this continuous extraction process option is presented in FIGS.

5*a*-5*c*. As with the "once-through" regeneration system presented in FIGS. 4*a*-4*c*, the remaining sulfur dissolved in the sulfur-enriched solvent may be distributed across the whole of the activated carbon surfaces and may no longer be concentrated in the localized area of the surface bound trinuclear-oxo basic iron (III) acetate-stabilized complex, further reducing the impact of any residual elemental sulfur on treating efficiency. Those having ordinary skill in art will appreciate how each of the general process steps in FIGS. 5*a*-5*c* may be optimized for various potential applications.

Figure 1B:
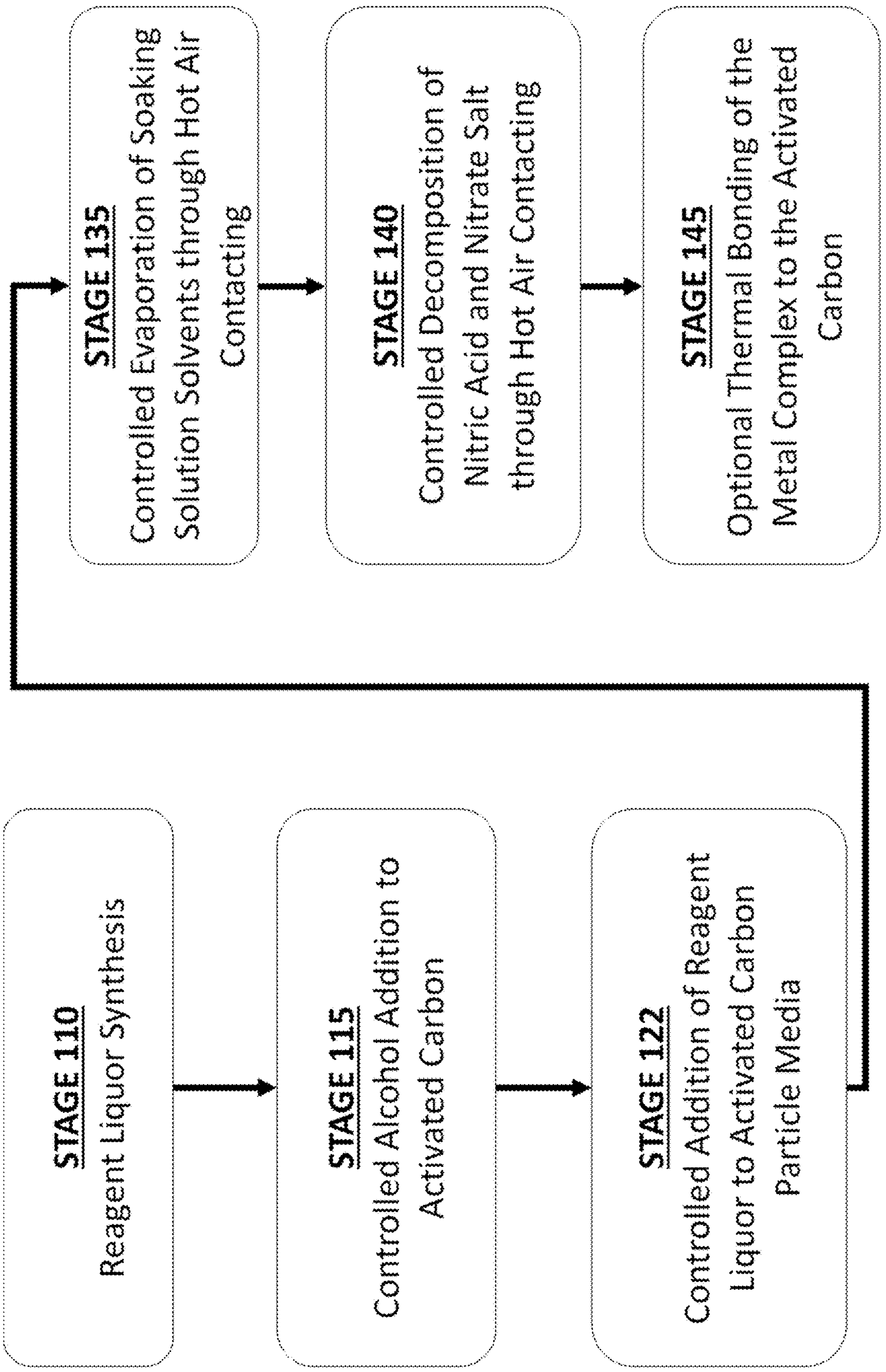

Turning now to FIGS. 1*a*-1*b*, FIGS. 1*a*-1*b* include flow charts providing an overview of the processes described herein for generating the presently disclosed formulation of the BCT-AC media product from the acidic aqueous soluble metal complex cations and activated carbon described herein. In a preferred embodiment, the metal complex cation is an acidic aqueous soluble trinuclear-oxo basic iron (III) acetate-stabilized complex cation. Once the complex cation is chemically bonded by activated carbon surface ligand formation at surface binding sites, it may be utilized for the treatment of hydrocarbon streams and other streams comprising hydrogen sulfide, mercaptan sulfur species, and carbonyl sulfide. The flow charts include the preferred overall process stages from synthesis of the BCT-AC media product. It will be appreciated by those having ordinary skill in the art that the flow charts shown in FIGS. 1*a*-1*b* are illustrative and that additional process stages may be added that are not described herein.

Referring now to FIG. 1*a* which describes the Capillary Soak procedure, at STAGE 110, the Reagent Liquor which contains the acidic aqueous soluble metal complex cation is synthesized. This solution is synthesized under controlled process conditions through the combination of a metal salt (e.g., iron (III) nitrate hydrated salt), RO/DI water and an organic acid (e.g., glacial acetic acid). Once formed it can be retained for a year or more.

STAGE 115 is a controlled dilution of the Reagent Liquor solution with an alcohol, such as denatured (methanol/IPA) ethanol, to yield a Soaking Solution. The Soaking Solution is formed through controlled blending of the Reagent Liquor and the alcohol and may be routed to a storage vessel before further use. Typically, the Soaking Solution has an alcohol concentration from about 40% to about 80% by volume. Once the alcohol has been added to the reagent liquor, operational conditions and storage times must be managed to ensure undesired reactions between the two materials are mitigated.

STAGE 121 is a controlled addition of the Soaking Solution to the activated carbon via spray contacting and mixing/blending. This may include short-duration low intensity mixing/blending, such as tumbling. The amount of Soaking Solution added may be calculated to ensure no excess "free" liquid solution that would be detected utilizing a sieve drain test. Additional dry activated carbon may be added if any free drainable liquid is observed. While it is acceptable to have liquid content below saturation, it is not desirable to have excess drainable Soaking Solution.

At STAGE 135, the first evaporative drying step is accomplished by transferring the activated carbon media into a hot air dryer, which is operated such that the Soaking Solution solvents are slowly and quantitively evaporated from the activated carbon media particles. Preferably, about 95% or more of the Soaking Solution solvents are removed. This is accomplished through the use of controlled hot air flow. The temperature of the hot air flow may be from about 200° F. to about 220° F., but may not exceed 250° F. Depending on the surface nature of the activated lignite carbon, some degree of the associated neutral nitric acid may also be removed from the activated carbon media through azeotropic evaporation with the aqueous humidity. This must be monitored, and the dryer hardware must be managed such that liquid phase nitric acid and alcohol mixtures do not accumulate.

At STAGE 140, following the removal of the majority of the solvents in STAGE 135, the heating of the previously wetted activated carbon is maintained by controlled hot air to decompose the residual nitric acid and nitrate salt. The temperature of the hot air flow may continue to be from about 200° F. to about 220° F., but may not exceed 250° F. Preferably, about 95% or more of the residual nitric acid and nitrate salt is decomposed in this step. Residual nitric acid will react with the activated carbon surface yielding gaseous $NO_2$ and CO, while the residual nitrate salt will catalytically decompose to gaseous $NO_2$ and NO. Depending on the surface chemistry of the ALC chosen, the time required for STAGE 140 may vary based on the equipment and amount of airflow used, with completion of STAGE 140 determined through on-line monitoring of the rate of evolved $NO_2$. In the case where HOK activated carbon media is used, its surface chemistry is such that the conditions required to remove nitrates also yields the molecular orbital bond formation required for the BCT-AC product and the overall process may be completed in STAGE 140.

STAGE 145 is an optional step that may be performed if the if complete molecular orbital bonding of the reagent complex cation to the activated carbon surface is not accomplished in STAGE 140. For example, this step is required when using Norit activated lignite carbon. STAGE 145 may be initiated once the bulk activated carbon media bed target temperature condition in STAGE 140 has been achieved and all residual nitrate has been removed. Once these conditions have been met, the operation of the hot air dryer is managed such that the activated carbon media temperature is increased at a controlled rate to facilitate surface bonding through molecular orbital formation between the metal complex cation and the activated carbon surface active sites yielding the surface bound neutral complex characteristic of the BCT-AC product. The temperature may be increased to about 240° F., but may not exceed 255° F. Following the bonding of the complex cation to the activated carbon surface, the completed BCT-AC media product is allowed to cool and may be packaged for commercial use.

Referring now to FIG. 1*b*, which describes the Sequential Capillary Addition procedure, at STAGE 110, the Reagent Liquor which contains the acidic aqueous soluble metal complex cation is synthesized. This solution is synthesized under controlled process conditions through the combination of a metal salt (e.g., iron (III) nitrate hydrated salt), RO/DI water and an organic acid (e.g., glacial acetic acid). Once formed it can be retained for a year or more.

At STAGE 115, the activated carbon media is placed in a mixer/blender where alcohol is slowly sprayed onto the media as it is slowly mixed. The mixer/blender may include a rotary mixer, a ribbon blender, or other devices known in the art. The amount of alcohol utilized is less than the activated carbon media retention capacity, with the preferred amount from about 50% to about 60% of the retention capacity. The addition rate and mixer/blender operation is managed to ensure complete absorption and uniform distribution of the alcohol throughout the activated carbon media's particles.

At STAGE 122, a predetermined amount of Reagent Liquor is slowly sprayed onto the alcohol-wetted media as it is slowly mixed. The amount of Reagent Liquor used is less than the media retention capacity when combined with the added alcohol, with the preferred amount of the Reagent Liquor being 40-50% of the retention capacity. The use of additional Reagent Liquor above the retention capacity is to be avoided due to the corrosive and potential reactivity of a nitric acid and ethanol mixture when present in a free liquid phase. Reagent Liquor addition below absorbent levels will not affect product reactivity, although it will proportionally reduce the sulfur loading capacity of the completed BCT-AC product.

At STAGE 135, the first evaporative drying step is accomplished by transferring the activated carbon media into a hot air dryer, which is operated such that the Soaking Solution solvents are slowly and quantitively evaporated from the activated carbon media particles. Preferably, about 95% or more of the Soaking Solution solvents are removed. This is accomplished through the use of controlled hot air flow that. The temperature of the hot air flow may be from about 200° F. to about 220° F., but may not exceed 250° F. Depending on the surface nature of the activated lignite carbon, some degree of the associated neutral nitric acid may also be removed from the activated carbon media through azeotropic evaporation with the aqueous humidity. This must be monitored, and the dryer hardware must be managed such that liquid phase nitric acid and alcohol mixtures do not accumulate.

At STAGE 140, following the removal of the majority of the solvents in STAGE 135, the heating of the previously wetted activated carbon is maintained by controlled hot air to decompose the residual nitric acid and nitrate salt. The temperature of the hot air flow may continue to be from about 200° F. to about 220° F., but may not exceed 250° F. Preferably, about 95% or more of the residual nitric acid and nitrate salt is decomposed in this step. Residual nitric acid will react with the activated carbon surface yielding gaseous $NO_2$ and CO, while the residual nitrate salt will catalytically decompose to gaseous $NO_2$ and NO. Depending on the surface chemistry of the ALC chosen, the time required for STAGE 140 may vary based on the equipment and amount of airflow used, with completion of STAGE 140 determined through on-line monitoring of the rate of evolved $NO_2$. In the case where HOK activated carbon media is used, its surface chemistry is such that the conditions required to remove nitrates also yields the molecular orbital bond formation required for the BCT-AC product and the overall process may be completed in STAGE 140.

STAGE 145 is an optional step that may be performed if the complete molecular orbital bonding of the reagent complex cation to the activated carbon media surface is not accomplished in STAGE 140. For example, this step is required when using Norit activated lignite carbon. STAGE 145 may be initiated once the bulk activated carbon media bed target temperature condition in STAGE 140 has been achieved and all residual nitrate has been removed. Once these conditions have been met, the operation of the hot air dryer is managed such that the activated carbon media temperature is increased at a controlled rate to facilitate surface bonding through molecular orbital formation between the metal complex cation and the activated carbon surface active sites yielding the surface bound neutral complex characteristic of the BCT-AC product. With Norit ALC the temperature may be increased to about 245° F., but may not exceed 255° F. Following the bonding of the complex cation to the activated carbon surface, the completed BCT-AC media product is allowed to cool and may be packaged for commercial use.

FIG. 2*a* depicts the 3-D chemical structure of the tri-nuclear-oxo basic iron (III) acetate-stabilized complex cation $[Fe_3(\mu_3\text{-}O)(CH_3CO_2^-)_6(H_2O)_3]^{+1}$ as observed through X-Ray crystallography techniques. This is the chemical structure as the complex cation would appear in an aqueous acidic solution. In the literature, this Inverse Coordination Chemistry oxo-complex is commonly referred to as "basic iron (III) acetate" or trinuclear-oxo basic iron (III) acetate. The at-scale X-Ray generated picture clearly shows the single oxygen symmetrically shared by three iron atoms creating the oxo μ3-O structure and the chelating bonding of the acetate functional groups that provide the structural framework cage that allows the oxo $\mu_3$-O structure with the three iron centers and its shared iron hybridized molecular orbitals to form.

Figure 2B:
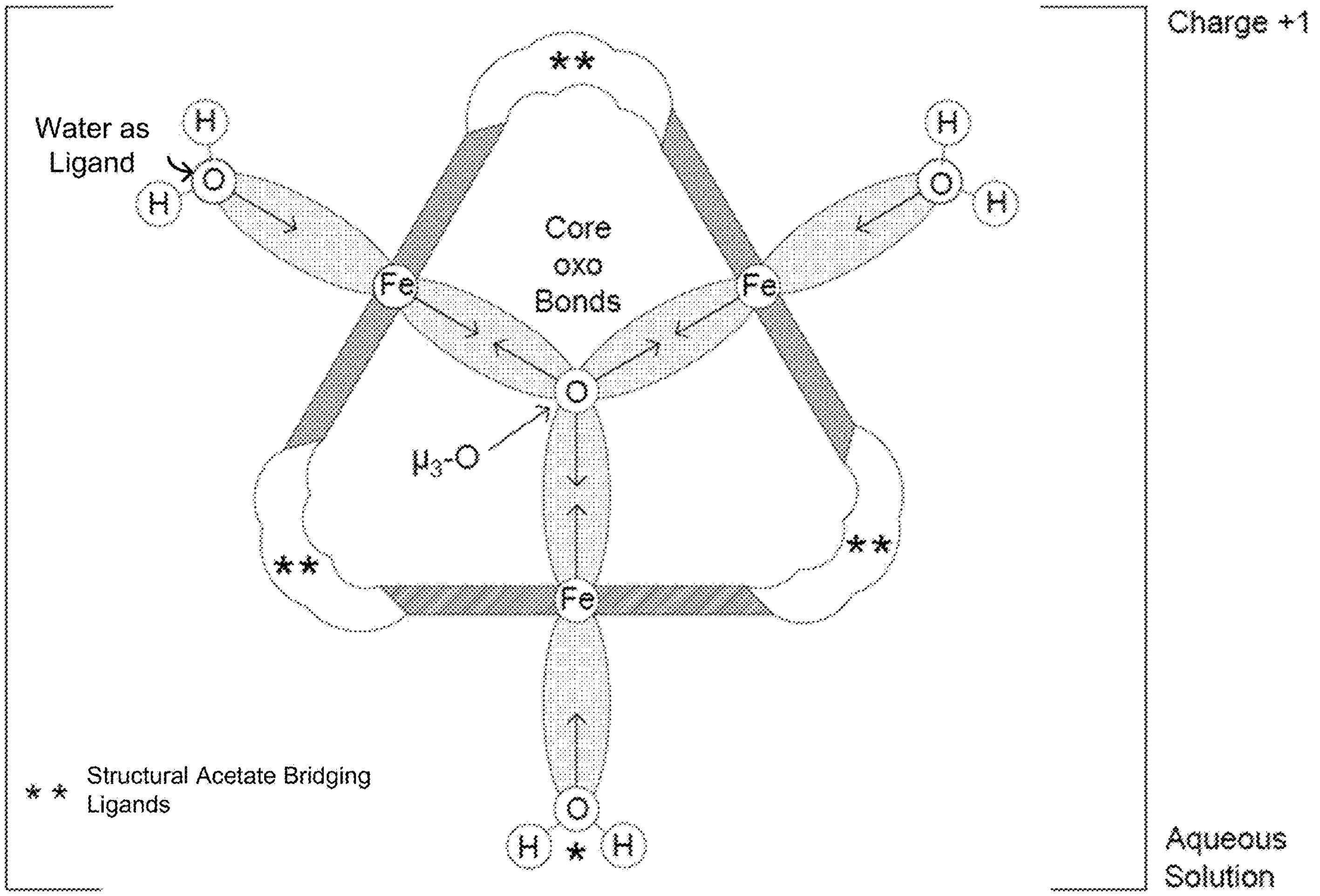
FIG. 2*b* represents a planar orientation view of the complex's core molecular structure illustrating the primary hybridized molecular orbitals that create the resonance distribution of electron density between the complex's out-of-plane ligand sites through its $\mu_3$-O (oxo) core. The six-acetate anion chelating-bridging ligands, shown in FIG. 2*a*, occupying the four planar coordination sites of each iron atom provide the stability and geometric structure of the tri-nuclear complex allowing the $\mu_3$-O (oxo) core's hybridized orbitals to form. As they do not directly participate in the complex's electron density transfer mechanism, they are not detailed in this and subsequent figures.

FIG. 2*b* provides a planar view of the complex's molecular orbital configuration including the bonding to the shared oxo-$\mu_3$O oxygen structure, which provides orbital resonance connection between the trans-out-of-plane orbitals of all three iron atoms and their hybridized atomic orbitals. The structural framework cage formed by the chelating acetate groups that bridge the individual iron atoms and stabilize the overall complex are not structurally illustrated but are indicated with {**}, as they do not directly participate in the complex surface bonding or in the electron density transfer mechanism.

Figure 2C:
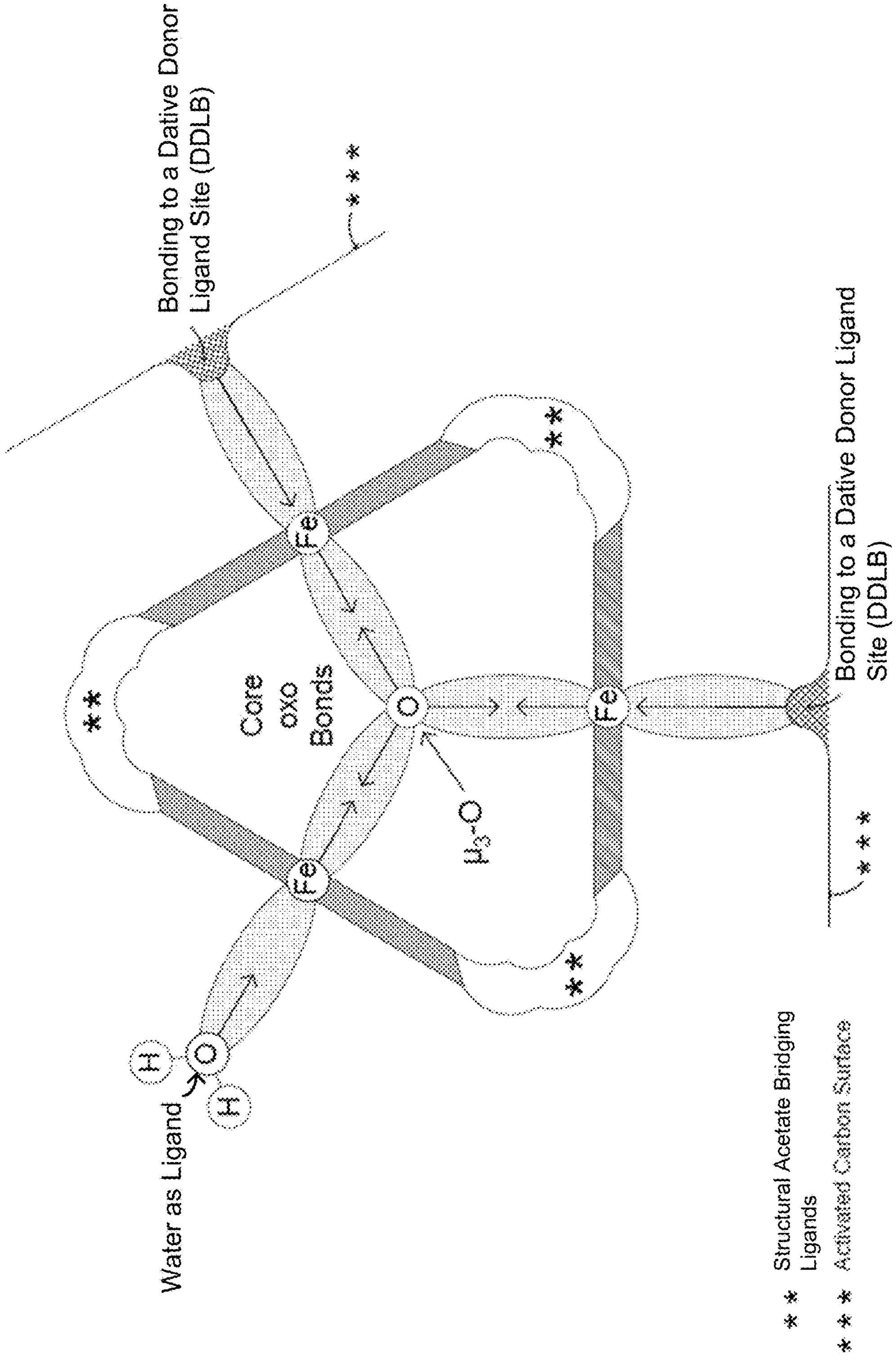
FIG. 2*c* presents a similar structural representation as FIG. 2*b* but depicts complex cation as it would be when it is chemically bound to an activated carbon surface through formation of dative donor ligand bonds with ligand binding sites on the surface of an activated carbon media. The formation of these specialized dative donor ligand bonds with surface area sites containing zones of complex conjugated olefinic carbon structures creates the molecular orbital linkage between the carbon surface and the structurally/chemically bound complex's out-of-plane ligands through the $\mu_3$-O (oxo) core's hybridized orbitals.

FIG. 2*c* provides a planar view of the complex's molecular orbital configuration when the complex is bound to the activated carbon surface through displacement of the water molecule ligand and formation of dative donor ligand based molecular orbitals between surface conjugated olefinic areas and the complex's trans-out-of-plane orbitals creating an activated carbon surface dative donor ligand that chemically binds the complex to the surface site. The figure also illustrates that the surface bound ligand formation maintains the oxo-$\mu_3$O oxygen structure, thereby allowing electron density to be shared by all three of the complex's iron atoms. This also illustrates that the core molecular orbital configuration is "symmetrical and planar", thereby providing the maximum possible resonance overlap and electron density conductivity to the activated carbon surface. As in FIG. 2*b* above, the structural framework cage formed by the chelating acetate groups that bridge the individual iron atoms and stabilize the overall complex are not structurally illustrated but are indicated with {**} as they do not directly participate in the complex surface bonding or in the electron density transfer mechanism.

Figure 2D:
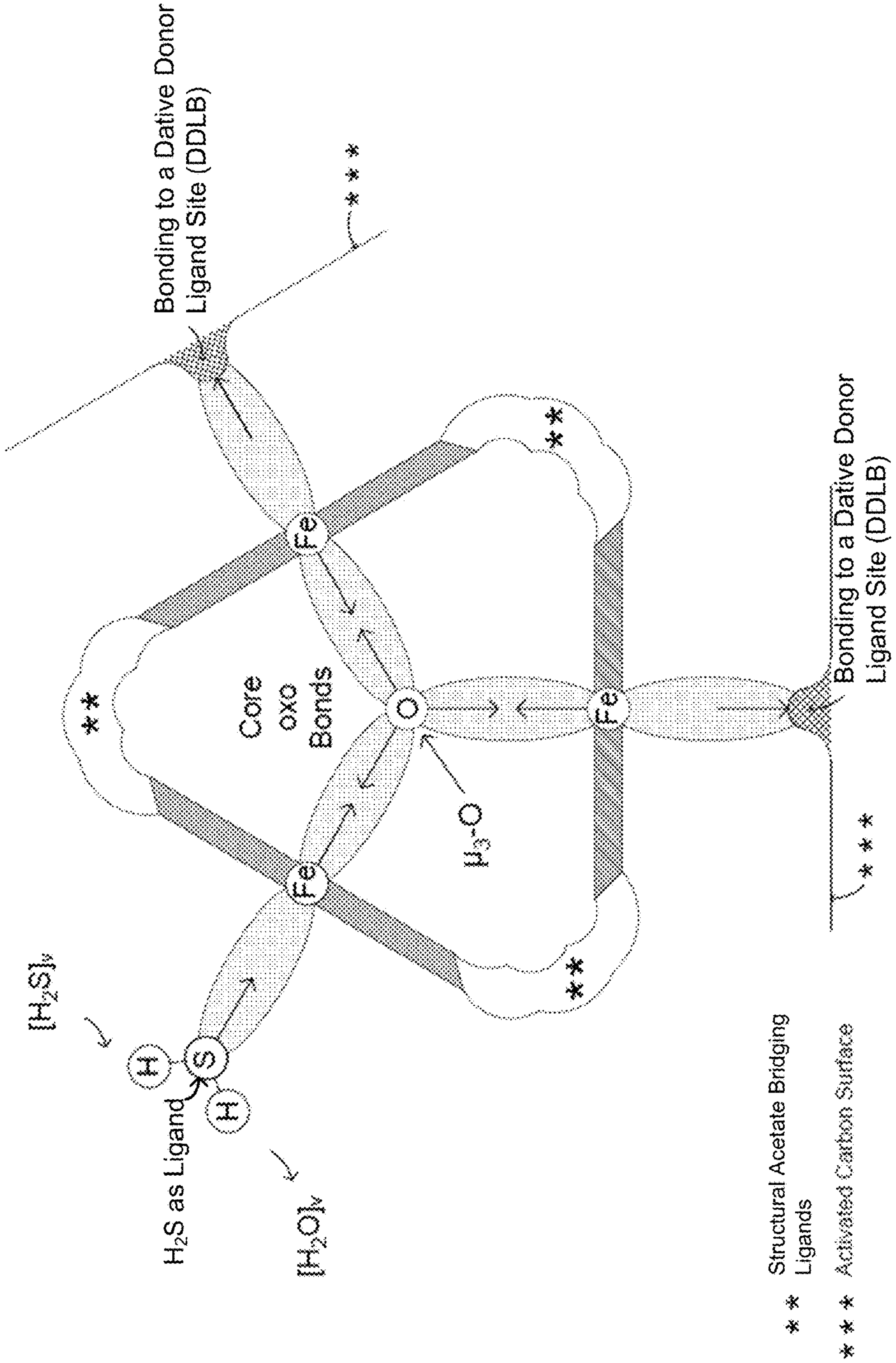
FIG. 2*d* utilizes the same structural template to illustrate the core initial reaction when a hydrogen sulfide molecule, due to its greater affinity for the out-of-plane Fe ligand site, displaces the water molecule from the site. Water molecules easily complex with iron atoms and will tend occupy Fe ligands sites on the complex cation in acidic aqueous solution but are easily displaced by the stronger dative donor ligand hydrogen sulfide. When coordinated with the bound complex, its orbitals become in resonance with the activated cardon surface through the above-described molecular orbital system of the surface bound Trinuclear-oxo Basic Iron (III) Acetate-stabilized complex.

FIG. 2*d* illustrates the reaction pathway for vapor phase $H_2S$ to displace the "place-holding" $H_2O$ from the non-activated carbon surface bound iron ligand site allowing hydrogen sulfide to become a ligand on the complex and its molecular orbitals become in-resonance with the complex's overall molecular orbital system.

Figure 2E:
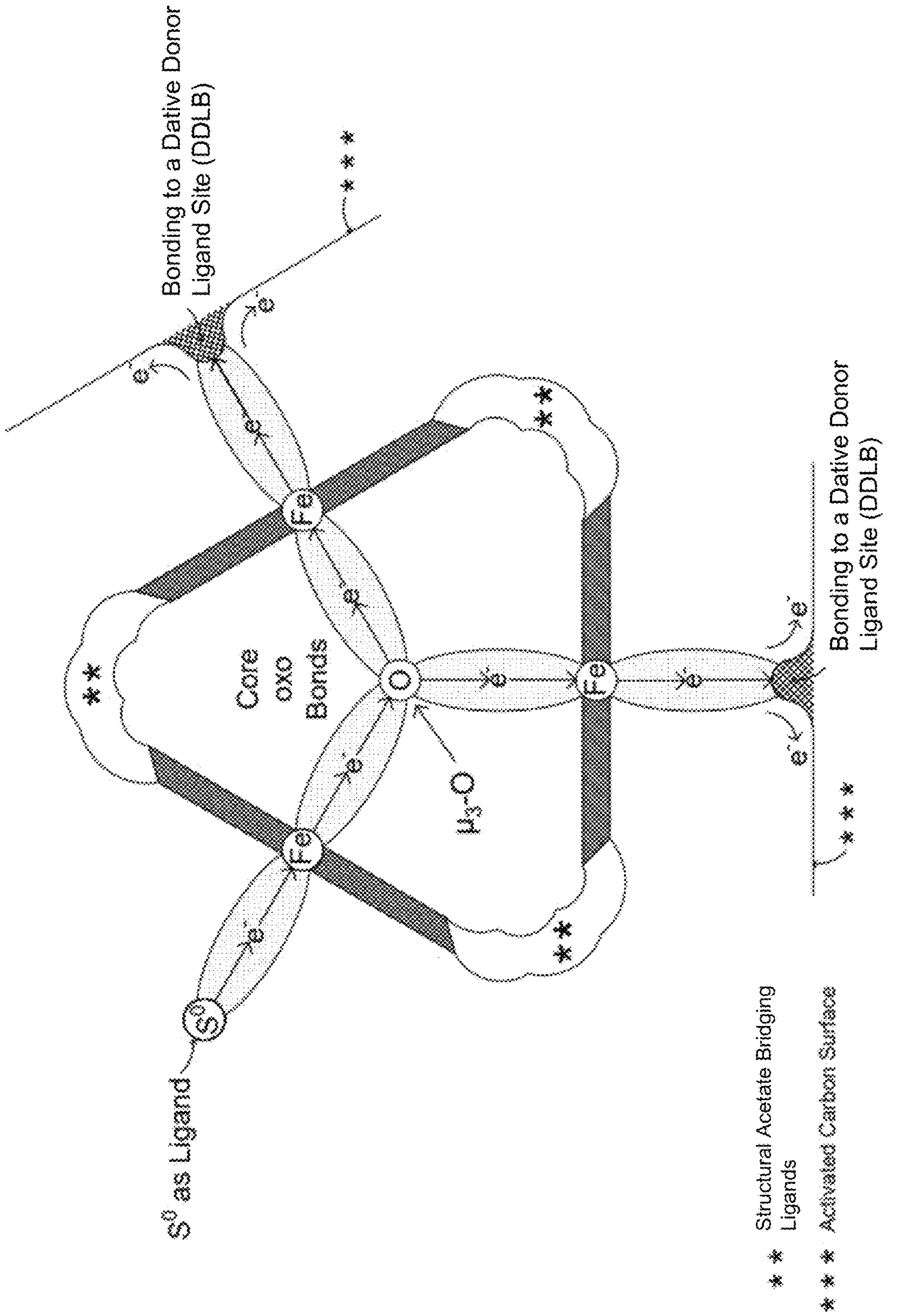
FIG. 2*e* illustrates the electron density transfer pathway, utilizing the same structural template as above, whereby the electron rich hydrogen sulfide molecule ($H_2S$) transfers electron density through the bound complex's molecular orbital system to the activated carbon surface electron sink resulting in its conversion to a molecule of elemental sulfur ($S^0$) as a dative donor ligand. As additional elemental sulfur atoms are formed at the site, the elemental sulfur will diffuse to the activated carbon surface forming either chains or rings.

FIG. 2*e* illustrates the reaction forming elemental sulfur and freed reactive hydrogen when the molecular orbital bound $H_2S$ is oxidized through electron density transfer from the reduced sulfur in hydrogen sulfide to the activated carbon surface conjugated olefinic electron density sink yielding elemental sulfur ($S^0$) at the ligand site and hydrogen.

Figure 3A:
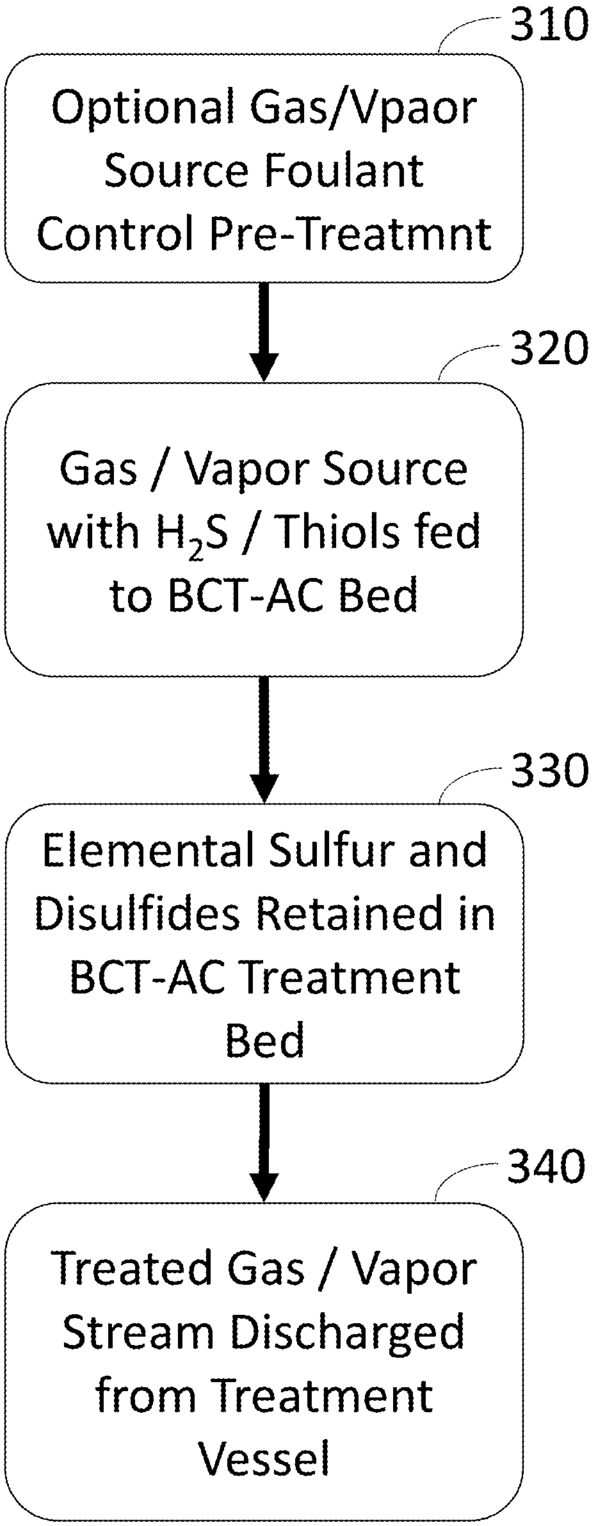
FIG. 3*a* depicts a simplified process overview that identifies the basic process alignment in which the formulated BCT-AC media as presented in FIGS. 1*a-c* would be used for removal of hydrogen sulfide and any vapor phase mercaptans present in a gas/vapor stream. As the gas/vapor to be treated enters the system (310), it passes through a pretreatment step (320) designed to remove/manage process stream components that could foul/deactivate the BCT-AC media bed. The vapor stream is then routed to a treatment vessel (325) containing the BCT-AC. When the hydrogen sulfide and vapor phase mercaptans contact the BCT-AC active sites, they are converted to and retained on the media bed (330) as non-volatile elemental sulfur and di-sulfides. The treated vapor/gas then exits the treatment system (340).

FIG. 3*a* depicts a simplified basic process by which the presently disclosed BCT-AC media product may be used to treat hydrocarbon vapors containing hydrogen sulfide in a treatment vessel. At step 310, the hydrocarbon vapor stream may optionally be fed into a foulant control treatment system that may remove impurities that could compromise the effectiveness and/or operational life of the BCT-AC media bed performance. The BCT-AC media product is incorporated into a BCT-AC media bed. At step 320, a source hydrocarbon vapor stream, having hydrogen sulfide and/or vapor phase thiols, is fed into the BCT-AC media-based treatment process. As the vapor phase containing the $H_2S$ and/or vapor phase Thiols is introduced into the treatment contactor at step 320, the vapor phase contacts the BCT-AC media surfaces within the BCT-AC media bed. The $H_2S$ and/or vapor phase thiols that contact the BCT-AC media surfaces interacts with the surface chemically bound metal complex. This facilitates the interaction between hydrogen sulfide vapor in the treatment vessel feed and the reactive bound complex ligand site present in the treatment vessel. Once the vapor is in contact with the BCT-AC media's surface bound complexes, at least one hydrogen sulfide molecule interacts with the complex and is converted to elemental sulfur at step 330. As the $H_2S$ is converted to elemental sulfur and transferred to the BCT-AC media surface, it is no longer in equilibrium with the $H_2S$ in the bulk vapor phase, thus driving the diffusion kinetics of the $H_2S$ from the vapor stream to reaction sites on the BCT-AC media. This results in its subsequent removal from the flowing vapor stream and retention on the BCT-AC surface. At step 340, the treated vapor stream is then discharged from the vessel with at least one hydrogen sulfide molecule removed from the vapor phase.

The retained elemental sulfur may be removed from the BCT-AC treatment bed by a hydrocarbon solvent, such as toluene or xylenes, selected for elemental sulfur solubility. The generated elemental sulfur (and/or disulfides when thiols are present) exits the contactor as a soluble component of the solvent utilized to wash the BCT-AC treatment bed. One of skill in the art will understand that the treatment vessel may have many configurations and forms.

Figure 3B:
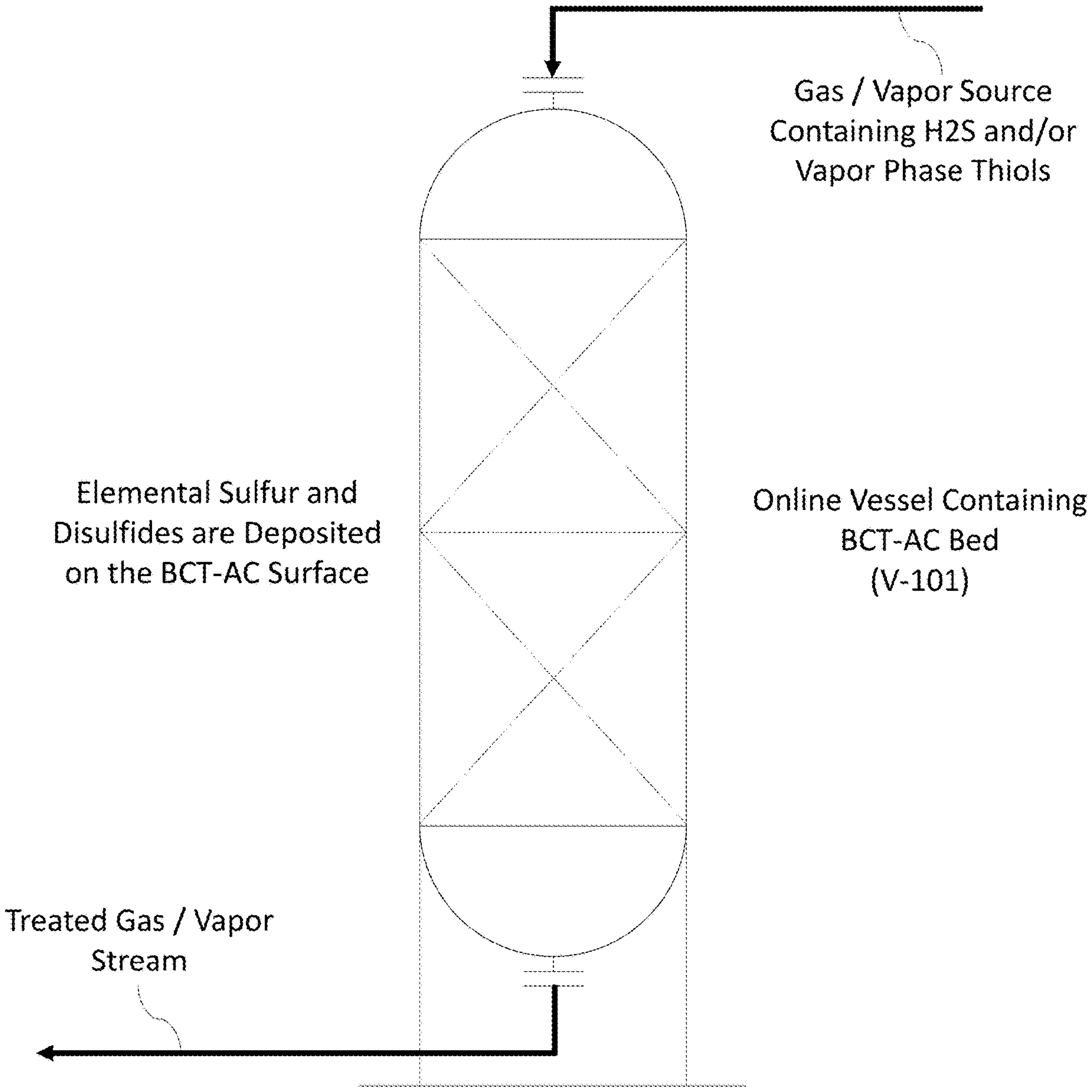
FIG. 3*b* depicts the configuration of a typical Treatment Vessel that may contain the formulated BCT-AC product in a commercial application with the vapor/gas stream in a top-down flow configuration. Although not depicted in FIG. 3*b*, the Treatment Vessel may be arranged in a bottom-up flow configuration.

FIG. 3*b* is a pictorial embodiment of FIG. 3*a*. One or more BCT-AC media treatment vessels (V-101) are aligned such that the vapor feed from any optional pre-treatment system described in step 310 with respect to FIG. 3*a* is routed to the top of the treatment vessel. Those having ordinary skill in the art will understand that vapor flow direction may be reversed in some specific applications.

Figure 3C:
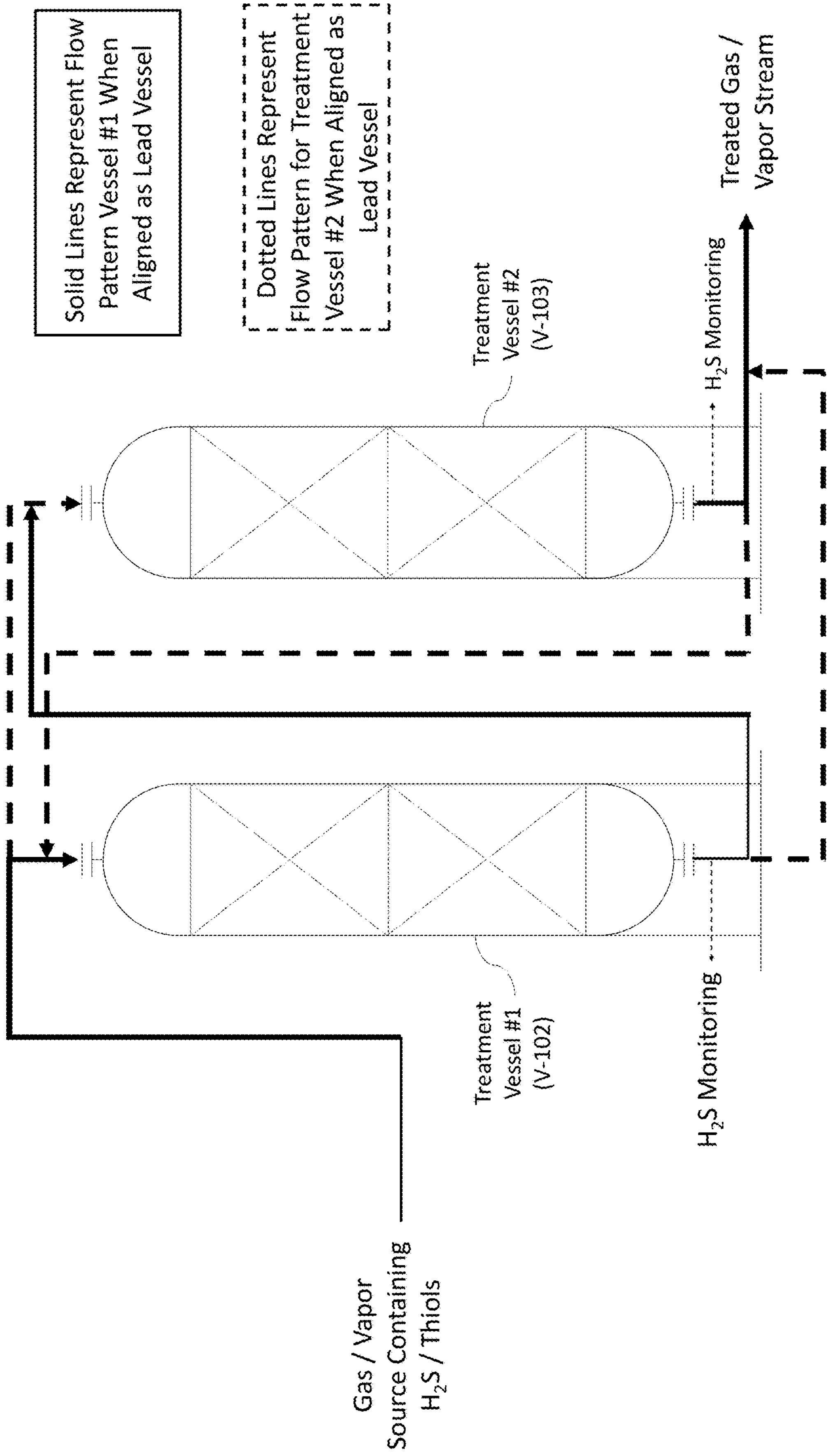
FIG. 3*c* Illustrates the typical "in series" configuration of two commercial BCT-AC treatment vessels where at any given time one vessel is in the "lead" position and the second is in the "lag" position. The vessels have piping configurations such that when the lead vessel is fouled, it may be isolated for solvent regeneration and the "lag" vessel can be configured to be in the "lead" position. The vessel containing the regenerated BCT-AC would be returned to service and configured into the "lag" position with this cycle being repeated in an on-going process.

FIG. 3*c* is another pictorial embodiment of FIG. 3*a* that includes two Treatment Vessels (V-102 and V-103) configured in a "Lead-to-Lag" alignment, where the hydrocarbon vapor is routed to the lead BCT-AC treatment vessel. FIG. 3*c* illustrates two "top-down flow" vessels connected in series, wherein the treated vapor from the "lead" vessel (V-102) flows to the top of the second "lag" vessel (V-103) for polishing treatment and ensuring $H_2S$ is removed to desired concentrations. This configuration also illustrates that the process allows each vessel to be aligned and its treated vapor monitored independently. For example, the embodiment allows a "lead" bed that is sufficiently fouled to impact treatment to be isolated for solvent wash regeneration while the minimally fouled "lag" vessel may be utilized, thereby allowing for uninterrupted vapor treatment. When the regeneration of the fouled vessel is completed, it can be placed back on-line in the "lag" position.

Figure 4A:
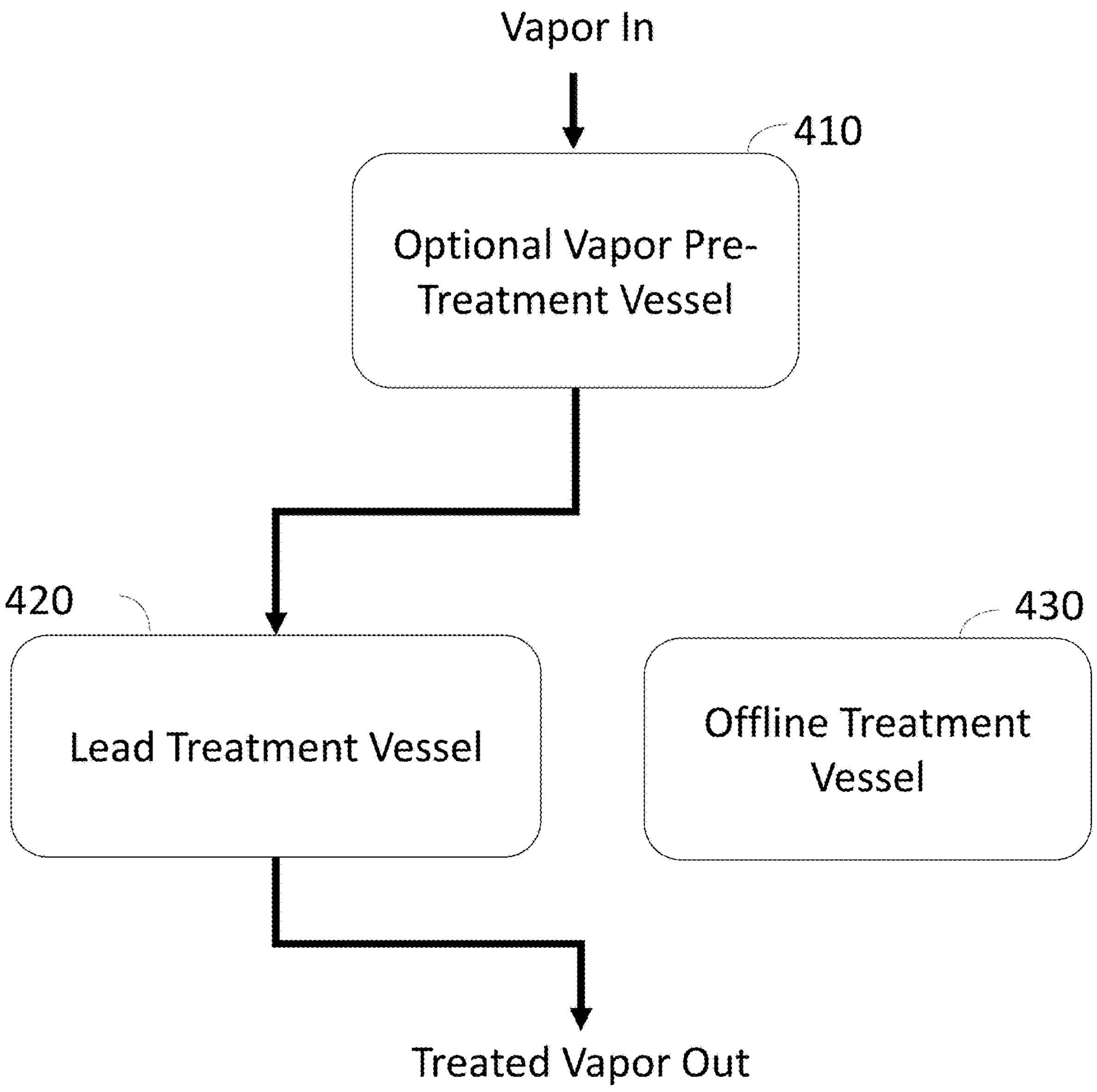
FIG. 4*a* depicts a simplified process schematic overview of a variation of FIG. 3*c*, wherein the two vessels are shown in a process alignment with a first vessel (420) in contact with the vapor flow and a second vessel (430) that has been isolated from the vapor/gas flow due to fouling from accumulated elemental sulfur and di-sulfides. The isolation of the second vessel (430) is designed to allow a liquid solvent to be utilized for foulant removal thus regenerating the BCT-AC media.

FIGS. 4*a*-4*d* depict a batch solvent wash procedure where an elemental sulfur lean solvent is delivered to a fouled treatment vessel and "bed foulant" contaminated wash solvent is removed for later processing. FIG. 4*a* provides a basic flow diagram for the embodiment of the BCT-AC media bed regeneration system to remove the elemental sulfur and disulfide foulants that are accumulated on the BCT-AC. FIG. 4*a* illustrates that the overall treating system will include an on-line lead treatment vessel 420 that treats the vapor/gas flow and an off-line treatment vessel 430 that is taken off-line due to accumulated foulants and is isolated to facilitate hydrocarbon solvent wash regeneration. The vapor may optionally be pretreated in a vapor pre-treatment system 410 prior to being treated in the on-line treatment vessel 420. The pre-treatment system may include a particulate filtration system, a coalescing filter system, an activated carbon media guard bed, a bulk separation system, or any combination thereof to remove contaminants from the gas/vapor stream prior to contact with the BCT-AC media. The system may further comprise on-line monitoring of water vapor/relative humidity downstream of the pretreatment system. Those having ordinary skill in the art will understand that additional treatment components may be added to the configuration such that there is always a lead/lag configuration treating the vapor flow while the fouled vessel is offline for solvent wash regeneration in some specific applications.

Figure 4B:
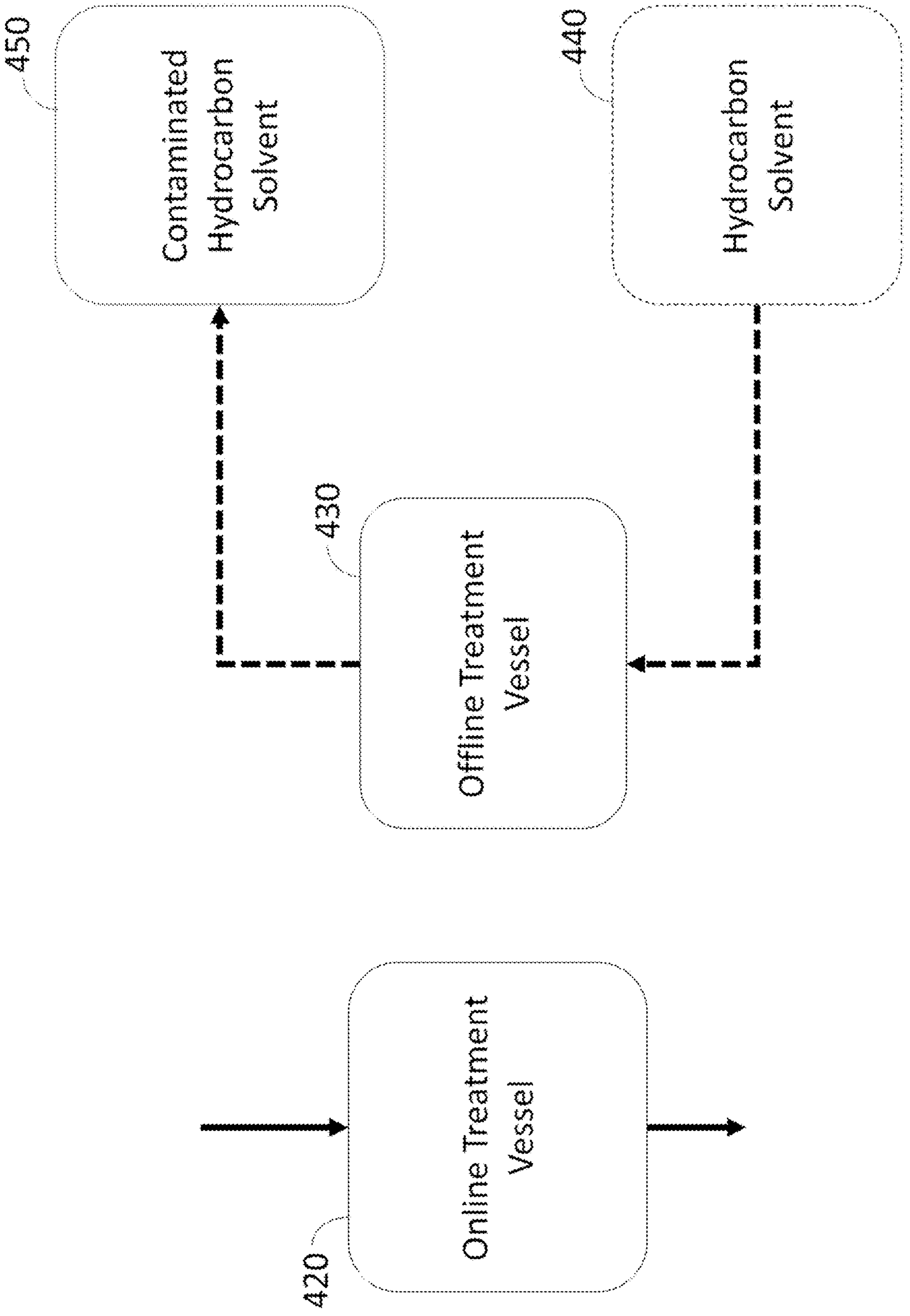
FIGS. 4*b* & 4*c* illustrates how a hydrocarbon solvent (preferred solvents are toluene or xylene) would be utilized in a "once through batch" process alignment where the liquid solvent is passed "bottom-up" through the fouled the BCT-AC media. The "clean" extraction solvent is routed once through the fouled BCT-AC media bed and accumulated in a receiving storage vessel at process conditions sufficient to remove the elemental sulfur and other bed foulant and to restore desired BCT-AC media treating capacity.
Figure 4C:
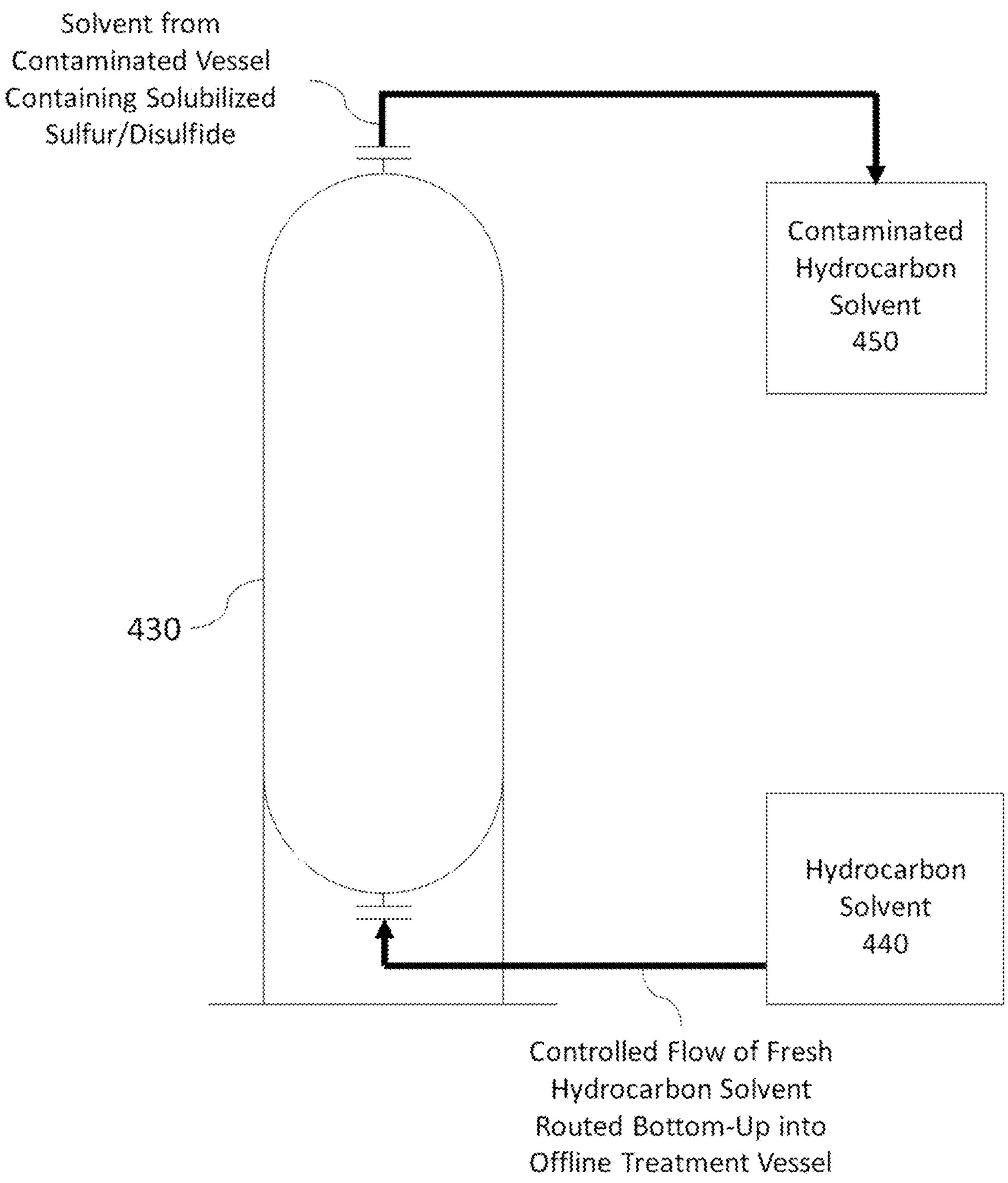

FIG. 4*b* provides a simplified flow diagram of the regeneration system wherein a hydrocarbon solvent 440 is pumped into the offline vessel 430, thereby removing accumulated elemental sulfur and other foulants. The now-contaminated solvent 450 is removed from the offline vessel 430 and may be stored or further processed. FIG. 4*c* shows a pictorial embodiment of the block diagram shown in FIG. 4*b*.

Figure 4D:
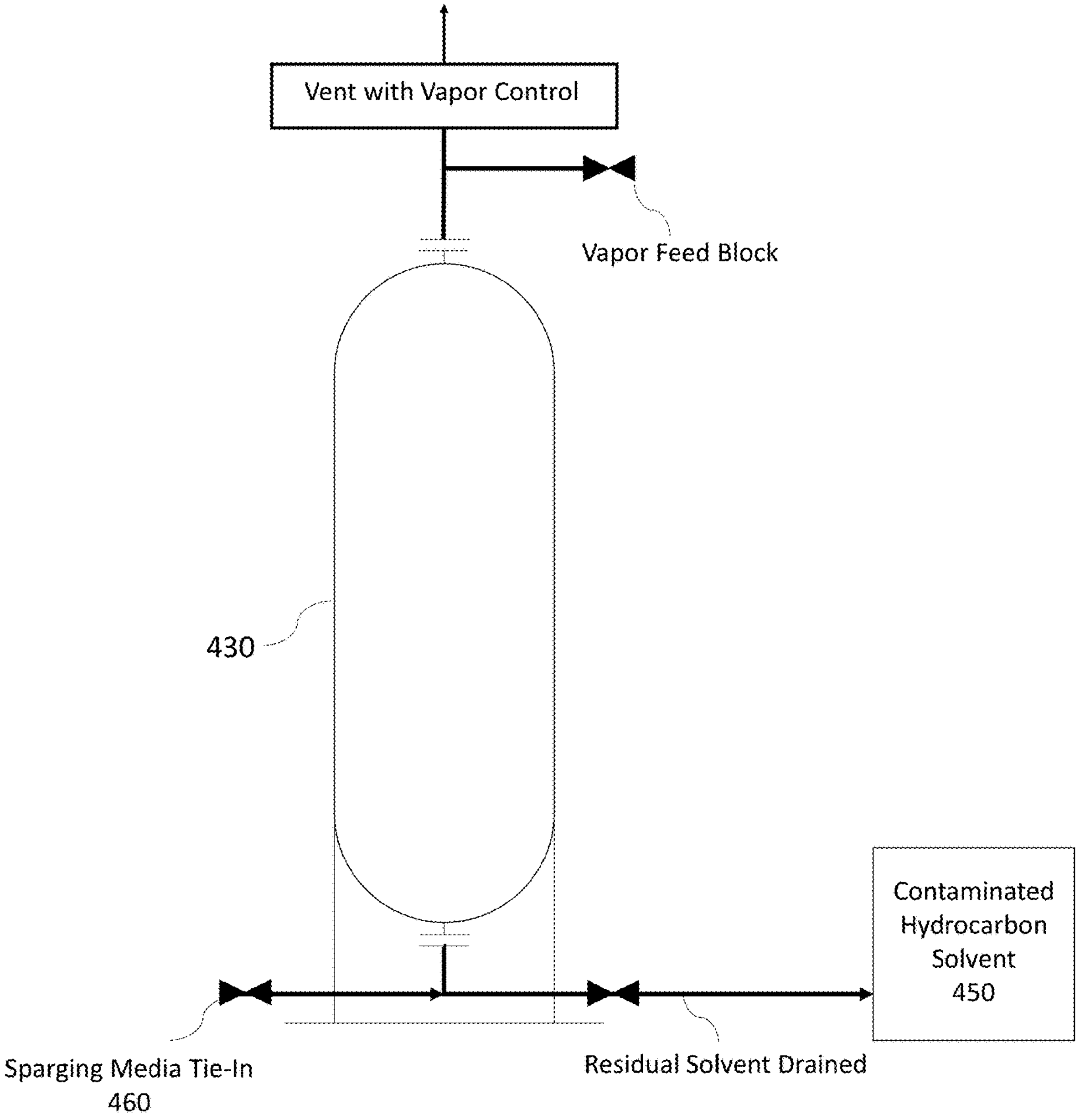
FIG. 4*d* illustrates the final regeneration cycle process step where extraction solvent flow is stopped, and the extraction solvent retained in the vessel, between particles and non-porous area of BCT-AC media bed is gravity drained to the contaminated solvent storage vessel. Solvent that is not gravity drained from the BCT-AC media pores is slowly evaporated when the vessel is placed "on-line" in the "lag" series position.

FIG. 4*d* illustrates the final step of the batch solvent wash procedure in which flow of the hydrocarbon solvent is stopped and the solvent-filled offline vessel 430 is allowed to drain. During this time, the flow of the vapor feed to the vessel 430 is stopped. This contaminated solvent 450 is captured and may be stored or further processed. Once the draining is complete, the offline vessel 430 may be returned to on-line service in the "lag" position with any remaining solvent allowed to evaporate and be removed within the treated bulk gas flow. If product issues prevent solvent removal in this manner, hot nitrogen may be introduced via a sparging media tie-in 460 to remove residual excess solvent. If any sulfur is present in the residual solvent, the sulfur may be retained as a dispersed surface coating and will not interfere with the next cycle's treatment efficiency or capacity.

FIG. 5*a* depicts a simplified flow diagram of a continuous "on-site recycle" solvent treatment system to regenerate a fouled BCT-AC treatment vessel V-105, according to at least one aspect of the present disclosure. The system presented in FIG. 5*a* illustrates an exemplary configuration to deliver hydrocarbon solvent from tank T-104, optionally heated using a heat exchanger X-101 to the top of the treatment vessel V-105. The solvent containing the sulfur/disulfide foulants then drains from the treatment vessel V-105 and may optionally be heated by a heat exchanger X-102 to prevent fouling of the equipment. The contaminated solvent is delivered to a flash drum/distillation vessel V-106 where the contaminated solvent is heated to its flash point. The solvent vapor from vessel V-106 is condensed by condenser X-103 before being returned to the storage tank T-104. Unlike in the batch wash system, the foulants in the continuous wash system may be recovered on-site.

Figure 5B:
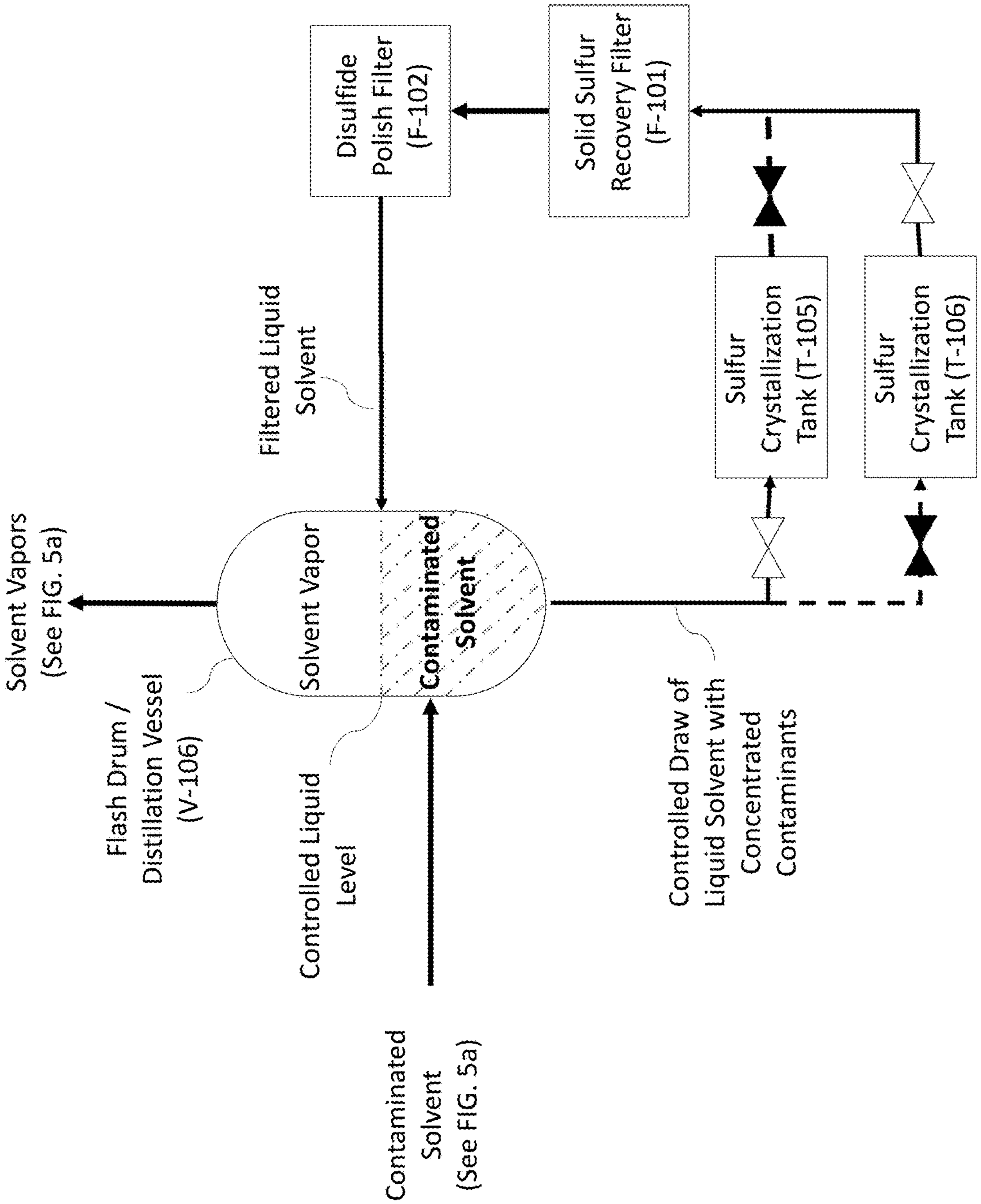
FIG. 5*b* a system for regenerating the extrication solvent on-site in a continuous process. Sulfur-saturated hot extraction solvent is bled on level control (or in a batch operation) to a controlled cooling vessel where the temperature-driven high concentration of sulfur is allowed to cool at a rate consistent with filterability." The slurry stream is filtered with the precipitated solid sulfur captured on the filtration element and the sulfur lean filter effluent returned back to the distillation vessel.

FIG. 5*b* illustrates an exemplary system to recover elemental sulfur from the contaminated wash solvent. A concentrated sulfur/solvent mixture is drained form vessel V-106 to one or more controlled crystallization cooling vessels T-105, T-106, etc. The rate of cooling in the vessels is managed to achieve the optimum sulfur crystal size for filtration (e.g., about 15-25° C.). Once the optimum crystal formation is achieved, the cooled solution is filtered at solid sulfur recovery filter F-101 to recover the solid crystalline sulfur. The solvent is then filtered using a disulfide polish filter F-102 before returning the filtered solvent to vessel V-106 for purification and reuse.

Figure 5C:
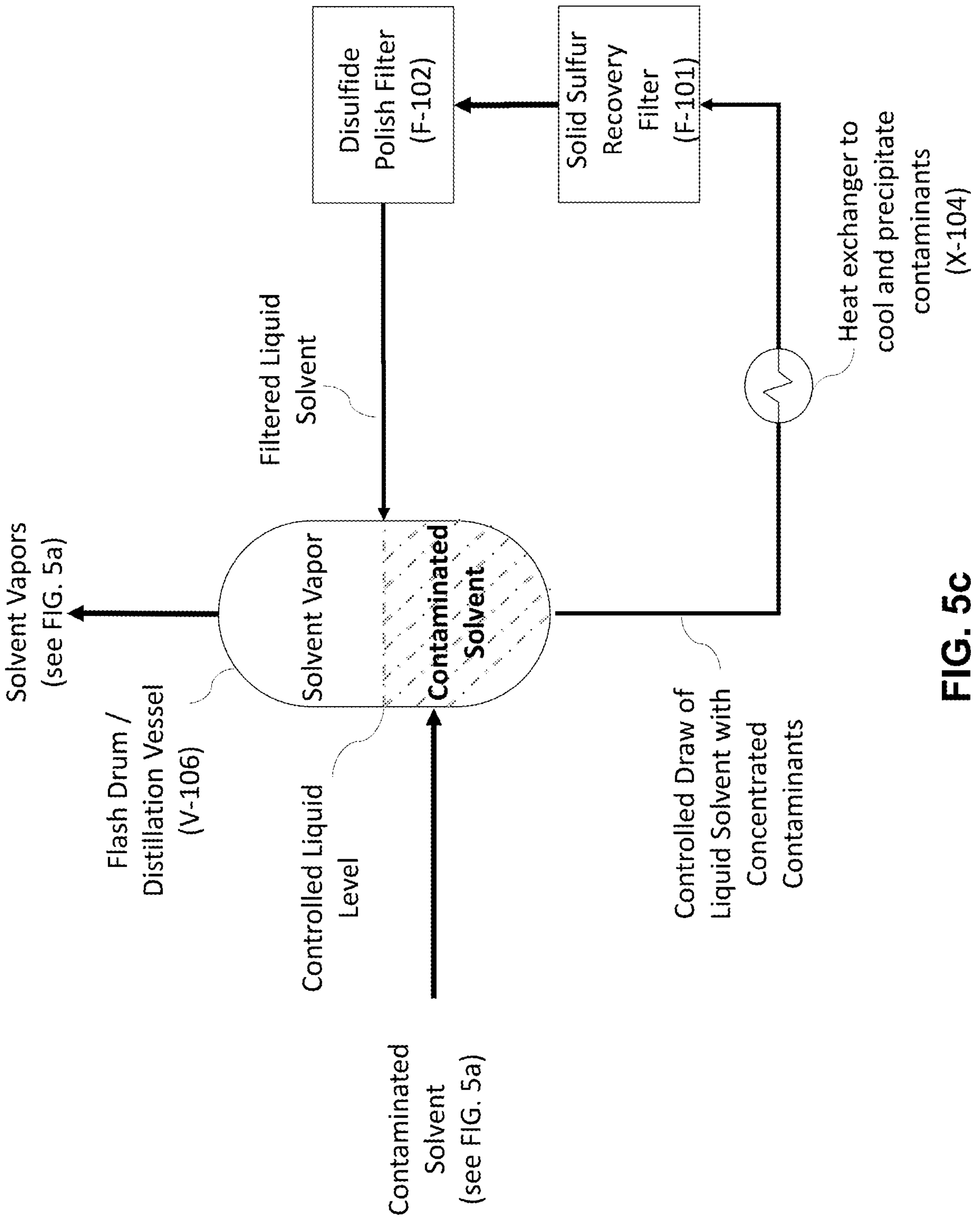
FIG. 5*c* illustrates another embodiment of the regeneration system of FIG. 5*b*, wherein the embodiment of FIG. 5*c* simply precipitates the elemental sulfur and other contaminants rather than crystallizing them.

FIG. 5*c* shows an alternative system to recover the elemental sulfur from the contaminated wash solvent. Rather than crystallizing the sulfur as in FIG. 5*b*, a heat exchanger X-104 is used to precipitate the contaminants from the concentrated contaminated solvent.

STATEMENTS OF THE DISCLOSURE

Statement 1: A method for removal of hydrogen sulfide [$H_2S$], vapor phase thiols [RSH], carbonyl sulfide [COS], or any combination thereof from a gas/vapor stream comprising: contacting the gas/vapor stream with a bound complex treated-activated carbon media (BCT-AC media), the BCT-AC media comprising an activated carbon surface with a molecular orbital surface-bound complex containing a tri-nuclear metal oxo core [$Fe_2M(\mu_3$-O)] molecular orbital structure.

Statement 2: The method of statement 1, wherein reduced sulfur ($S^{-2}$) atoms in the $H_2S$ or COS are oxidized to elemental sulfur ($S^0$), the vapor phase thiols [RSH] are oxidized to an envelope of disulfides [RSSR], and/or the elemental sulfur and/or RSSR is deposited and retained on the activated carbon surface.

Statement 3: The method of statement 1, wherein M in [$Fe_2M(\mu_3$-O)] is selected from the group consisting of Iron (Fe), Vanadium (V), and Cobalt (Co).

Statement 4: The method of statement 3, wherein the molecular orbital surface-bound complex containing a tri-nuclear metal oxo core [$Fe_2M(\mu_3$-O)] molecular orbital structure is [$Fe_3(\mu_3$-O)$(CH_3CO_2^-)_6$(ACS-DDLB)$_2$($H_2O$)], wherein ACS-DDLB refers to activated carbon surface bound dative donor ligand bonds bound to the trinuclear-oxo basic iron (III) acetate-stabilized complex.

Statement 5: The method of statement 1, wherein the activated carbon surface comprises unsaturated olefinic areas capable of forming dative donor ligand bonds.

Statement 6: The method of statement 1, wherein the activated carbon is acid washed lignite activated carbon.

Statement 7: The method of claim 1, further comprising pre-treating the gas/vapor stream prior to contacting the BCT-AC media.

Statement 8: The method of statement 1, further comprising regenerating the BCT-AC media through a hydrocarbon solvent wash.

Statement 9: The method of statement 8, wherein the hydrocarbon solvent comprises xylenes, toluene, or a combination thereof.

Statement 10: The method of statement 1, wherein the method does not result in the formation of sulfur oxides.

Statement 11: The method of statement 1, wherein no aqueous caustic is added to the BCT-AC media.

Statement 12: The method of statement 1, wherein no oxygen or oxidant is added to the gas/vapor stream.

Statement 13: A system for treating a gas/vapor stream comprising hydrogen sulfide [$H_2S$], vapor phase thiols [RSH], carbonyl sulfide [COS], or any combination thereof, the system comprising a first bound complex treated-activated carbon media (BCT-AC media) treatment vessel and a second BCT-AC treatment vessel, the BCT-AC treatment vessels including a BCT-AC media comprising an activated carbon surface with a molecular orbital surface-bound complex containing a tri-nuclear metal oxo core [$Fe_2M(\mu_3$-O)] molecular orbital structure, wherein the gas/vapor stream flows through the first BCT-AC treatment vessel, the second BCT-AC treatment vessel, or both BCT-AC treatment vessels.

Statement 14: The system of statement 13, further comprising a pre-treatment system, wherein the pre-treatment system comprises a particulate filtration system, a coalescing filter system, an activated carbon media guard bed, a bulk separation system, or any combination thereof.

Statement 15: The system of statement 13, further comprising a hydrocarbon solvent regeneration system in fluid communication with the treatment vessel, such that a hydrocarbon solvent is operable to remove elemental sulfur and disulfide compounds from the surface of the BCT-AC media.

Statement 16: The system of statement 15, wherein the hydrocarbon solvent regeneration system includes a recycle loop for reuse of the hydrocarbon solvent.

Statement 17: The system of statement 16, wherein the hydrocarbon solvent does not alter the structure, chemical stability, or electron density transfer capability of the BCT-AC media.

Statement 18: The system of statement 15, wherein the hydrocarbon solvent comprises xylenes, toluene, or a combination thereof.

Statement 19: The system of statement 13, wherein M in [$Fe_2M(\mu_3$-O)] is selected from the group consisting of Iron (Fe), Vanadium (V), and Cobalt (Co).

Statement 20: The system of statement 19, wherein the molecular orbital surface-bound complex containing a tri-nuclear metal oxo core [$Fe_2M(\mu_3$-O)] molecular orbital structure is [$Fe_3(\mu_3$-O)$(CH_3CO_2^{-"})_6$(ACS-DDLB)$_2$($H_2O$)], wherein ACS-DDLB refers to activated carbon surface bound dative donor ligand bonds bound to the trinuclear-oxo basic iron (III) acetate-stabilized complex.

Statement 21: The system of statement 13, wherein the activated carbon is acid washed lignite activated carbon.

Statement 22: A method for making a bound complex treated-activated carbon media (BCT-AC media), the method comprising: mixing or blending an alcohol and a Reagent Liquor with activated carbon, the Reagent Liquor comprising a metal complex having the structure [$Fe_2M(\mu_3$-O)$(CH_3CO_2^-)_6(H_2O)_3]^{+1}$[Anion]$^{-1}$, thereby forming a wetted activated carbon; evaporating excess liquid from the wetted activated carbon; and heating the wetted activated carbon to no more than 250° F.

Statement 23: The method of statement 22, wherein the activated carbon is acid washed lignite activated carbon.

Statement 24: The method of statement 23, wherein the acid washed lignite activated carbon originates from Cologne, Germany.

Statement 25: The method of statement 22, wherein the alcohol comprises ethanol.

Statement 26: The method of statement 22, wherein the alcohol is denatured ethanol.

Statement 27: The method of statement 22, wherein M in [$Fe_2M(\mu_3$-O)$(CH_3CO_2^-)_6(H_2O)_3]^{+1}$ [Anion]$^{-1}$ is selected from the group consisting of Iron (Fe), Vanadium (V), and Cobalt (Co).

Statement 28: The method of statement 27, wherein M is iron.

Statement 29: The method of statement 22, wherein Anion is a chloride anion or a nitrate anion.

Statement 30: The method of statement 29, wherein Anion is a nitrate anion.

Statement 31: The method of statement 22, wherein the alcohol is added to the activated carbon during the mixing or blending before the Reagent Liquor is added to the activated carbon.

Statement 32: The method of statement 31, wherein the Reagent Liquor is added to the activated carbon immediately after the alcohol is added to the activated carbon.

Statement 33: The method of statement 31, wherein the alcohol is mixed with the activated carbon until the alcohol is absorbed by the activated carbon.

Statement 34: The method of statement 22, wherein an amount of Reagent Liquor and alcohol is added such that a sieve drain test does not result in any observed liquid drainage.

Statement 35: The method of any one of statements 22-34, wherein the evaporation is accomplished at a temperature from about 200° F. to about 220° F.

Statement 36: The method of statement 22, wherein an amount of Reagent Liquor and an amount of alcohol added are less than the media retention capacity of the activated carbon.

Statement 37: The method of statement 22, wherein the evaporation is accomplished via a hot air dryer.

Statement 38: The method of statement 22, wherein the evaporation is accomplished at a temperature from about 200° F. to about 220° F.

Statement 39: The method of statement 22, wherein the mixing or blending comprises spraying the alcohol or the Reagent Liquor on the activated carbon.

Statement 40: The method of statement 22, further comprising pre-mixing the alcohol and the Reagent Liquor prior to the mixing or blending.

Statement 41: The method of statement 22, wherein the heating is accomplished via a hot air dryer.

Statement 42: The method of statement 22, further comprising curing the activated carbon at a temperature of no more than 255° F.

Statement 43: The method of statement 22, wherein the evaporating and heating steps are accomplished in a single hot air dryer having a constant air temperature.

Statement 44: The method of statement 43, wherein the constant air temperature is from about 200° F. to about 220° F.

Statement 45: A composition for the removal of hydrogen sulfide [$H_2S$], vapor phase thiols [RSH], carbonyl sulfide [COS] or any combination thereof from a gas/vapor stream, the composition comprising: a porous solid media comprising a bound basic iron (III) acetate-stabilized complex bonded to a surface of a porous solid media, wherein the bound basic iron (III) acetate-stabilized complex comprises a tri-nuclear metal oxo core [$Fe_2M(\mu_3\text{-}O)$] molecular orbital structure and the porous solid media comprises acid washed lignite activated carbon that originates from Cologne, Germany.

Statement 46: The composition of statement 45, wherein the porous solid media comprises particles having a particle size of from about 0.50 millimeters to about 2.50 millimeters.

Statement 47: The composition of statement 45, wherein the porous solid media comprises particles having a surface area of from about 250 $m^2/g$ to about 1000 $m^2/g$.

Statement 48: The composition of statement 45, wherein the porous solid media comprises particles having a total pore volume from about 0.25 to about 1.15 ml/g.

Various embodiments of the disclosure have been discussed in detail. While specific implementations are discussed, it should be understood that this is done for illustration purposes only. A person skilled in the relevant art will recognize that other components and configurations may be used without parting from the spirit and scope of the disclosure. Thus, the description and drawings herein are illustrative and are not to be construed as limiting. Numerous specific details are described to provide a thorough understanding of the disclosure. However, in certain instances, well-known or conventional details have not been described in order to avoid obscuring the description.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Thus, references to one or an embodiment in the present disclosure can be references to the same embodiment or any embodiment; and such references mean at least one of the embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/mL" should also be understood to provide support for the range of "50 mg/mL to 80 mg/mL."

What is claimed is:

1. A method of removing hydrogen sulfide [$H_2S$], carbonyl sulfide [COS], or a combination thereof from a gas/vapor stream comprising:

contacting the gas/vapor stream comprising hydrogen sulfide [$H_2S$], carbonyl sulfide [COS], or a combination thereof, with a bound complex treated-activated carbon media (BCT-AC media), the BCT-AC media comprising an activated carbon surface with a molecular orbital surface-bound complex containing a tri-nuclear metal oxo core [$Fe_2M(\mu_3\text{-}O)$] molecular orbital structure, wherein M in [$Fe_2M(\mu_3\text{-}O)$] is selected from the group consisting of Iron (Fe), Vanadium (V), and Cobalt (Co).

2. The method of claim 1, wherein reduced sulfur ($S^{-2}$) atoms in the $H_2S$ or COS are oxidized to elemental sulfur ($S^0$) and the elemental sulfur is deposited and retained on the activated carbon surface.

3. The method of claim 1, wherein M in [$Fe_2M(\mu_3$-O)] is Iron (Fe).

4. The method of claim 1, wherein the molecular orbital surface-bound complex containing a tri-nuclear metal oxo core [$Fe_2M(\mu_3$-O)] molecular orbital structure is [$Fe_3(\mu_3$-O)($CH_3CO_2^-)_6$(ACS-DDLB)$_2$($H_2O$)], wherein ACS-DDLB refers to activated carbon surface bound dative donor ligand bonds bound to the trinuclear-oxo basic iron(III) acetate-stabilized complex.

5. The method of claim 1, wherein the activated carbon surface comprises unsaturated olefinic areas capable of forming dative donor ligand bonds.

6. The method of claim 1, wherein the activated carbon is acid washed lignite activated carbon.

7. The method of claim 1, further comprising pre-treating the gas/vapor stream prior to contacting the BCT-AC media.

8. The method of claim 1, further comprising regenerating the BCT-AC media through a hydrocarbon solvent wash.

9. The method of claim 8, wherein the hydrocarbon solvent comprises xylenes, toluene, or a combination thereof.

10. The method of claim 1, wherein the method does not result in the formation of sulfur oxides.

11. The method of claim 1, wherein no aqueous caustic is added to the BCT-AC media.

12. The method of claim 1, wherein no oxygen or oxidant is added to the gas/vapor stream.

* * * * *